(12) United States Patent
Takahashi et al.

(10) Patent No.: US 12,502,960 B2
(45) Date of Patent: Dec. 23, 2025

(54) INFORMATION PROCESSING DEVICE, INFORMATION PROCESSING METHOD, AND NON-TEMPORARY STORAGE MEDIUM

(71) Applicant: TOYOTA JIDOSHA KABUSHIKI KAISHA, Toyota (JP)

(72) Inventors: Yuki Takahashi, Shizuoka-ken (JP); Naotoshi Kadotani, Mishima (JP); Nana Kikuire, Shizuoka-ken (JP); Yuki Nishikawa, Numazu (JP); Takahiko Kuwabara, Yokohama (JP); Ryusei Gichu, Tokyo (JP); Takashi Ota, Tokyo (JP); Toshifumi Iwase, Tokyo (JP); Hironori Ito, Tokyo (JP); Hisanobu Inoue, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 18/438,816

(22) Filed: Feb. 12, 2024

(65) Prior Publication Data
US 2024/0408963 A1  Dec. 12, 2024

(30) Foreign Application Priority Data
Feb. 14, 2023 (JP) .................. 2023-020797

(51) Int. Cl.
*B60K 35/28* (2024.01)
(52) U.S. Cl.
CPC ........ *B60K 35/28* (2024.01); *B60K 2360/188* (2024.01); *B60K 2360/566* (2024.01); *B60K 2360/577* (2024.01); *B60K 2360/797* (2024.01)

(58) Field of Classification Search
CPC ............. B60K 35/28; B60K 2360/188; B60K 2360/566; B60K 2360/577; B60K 2360/797; H04L 63/0861; H04W 12/06; H04W 12/77; H04W 4/40; H04W 4/80; H04W 12/50; H04M 1/72403; B60Q 1/507; B60Q 1/50; B60Q 1/547; B60Q 2800/10; B60Q 2900/30; B60Q 1/46; B60Q 1/543; G06Q 50/40
See application file for complete search history.

(56) References Cited

U.S. PATENT DOCUMENTS 9,964,950 B2  5/2018  Takano
10,017,116 B2  7/2018  Sato
(Continued)

FOREIGN PATENT DOCUMENTS

JP  2019-175150 A  10/2019
JP  2020142737 A   9/2020
(Continued)

*Primary Examiner* — Omeed Alizada
(74) *Attorney, Agent, or Firm* — Sughrue Mion, PLLC

(57) ABSTRACT

An information processing device includes a processor. The processor is configured to cause an information display unit to blink with a predetermined blinking pattern. The information display unit is arranged on a vehicle such that a user of the vehicle is able to see the information display unit from outside of the vehicle. The processor is configured to transmit to a terminal of the user blinking pattern information which causes at least part of a display screen of the terminal of the user to blink in the same pattern as the predetermined blinking pattern.

12 Claims, 26 Drawing Sheets

(56) References Cited

U.S. PATENT DOCUMENTS

| | | | |
|---|---|---|---|
| 10,310,508 B2 | 6/2019 | Kunisa et al. | |
| 10,452,930 B2 | 10/2019 | Sato | |
| 10,663,973 B2 | 5/2020 | Hashimoto et al. | |
| 10,895,875 B2 | 1/2021 | Hashimoto et al. | |
| 11,001,198 B2 | 5/2021 | Morimura et al. | |
| 11,275,382 B2 | 3/2022 | Hashimoto et al. | |
| 2017/0294130 A1* | 10/2017 | Donnelly | H04W 4/024 |
| 2020/0175866 A1* | 6/2020 | Yamashita | G08G 1/005 |
| 2021/0078490 A1* | 3/2021 | Lujan | B60Q 5/00 |
| 2021/0170943 A1 | 6/2021 | Mimura et al. | |
| 2021/0229598 A1 | 7/2021 | Morimura et al. | |
| 2021/0380124 A1 | 12/2021 | Urano et al. | |
| 2022/0066444 A1 | 3/2022 | Mimura et al. | |
| 2022/0135082 A1* | 5/2022 | Dumas | G08G 1/133 |
| | | | 701/26 |
| 2022/0144164 A1 | 5/2022 | Tani | |
| 2023/0316890 A1* | 10/2023 | Allan | G08B 7/06 |
| | | | 340/531 |

FOREIGN PATENT DOCUMENTS

| | | |
|---|---|---|
| JP | 2021-91305 A | 6/2021 |
| JP | 7085598 B2 | 6/2022 |

* cited by examiner

INFORMATION PROCESSING DEVICE, INFORMATION PROCESSING METHOD, AND NON-TEMPORARY STORAGE MEDIUM

CROSS-REFERENCE TO RELATED APPLICATION

This application claims priority to Japanese Patent Application No. 2023-020797 filed on Feb. 14, 2023, incorporated herein by reference in its entirety.

BACKGROUND

1. Technical Field

The present disclosure relates to an information processing device, an information processing method, and a non-temporary storage medium.

2. Description of Related Art

An information presentation device that, when an autonomous driving vehicle finds a user of the autonomous driving vehicle, presents a display on a vehicle body that makes the user feel a sense of attachment to the autonomous driving vehicle (see, for example, Japanese Unexamined Patent Application Publication No. 2021-91305) is well-known.

SUMMARY

When a user uses an autonomous driving taxi at a boarding/exiting platform of a train station after exiting a train, even when a display that makes the user feel attached to the autonomous driving taxi is presented on a vehicle body like the above-described information presentation device, if there are many autonomous driving taxis at the boarding/exiting platform of the train station, it is quite difficult for the user to find the autonomous driving taxi he or she will use from among these autonomous driving taxis.

A first aspect of the disclosure relates to an information processing device including a processor. The processor is configured to cause an information display unit to blink with a predetermined blinking pattern, and transmit to a terminal of the user blinking pattern information which causes at least part of a display screen of the terminal of the user to blink in the same pattern as the predetermined blinking pattern. The information unit is arranged on a vehicle such that a user of the vehicle can see the information display unit from outside of the vehicle.

In the first aspect, the information display unit may be an indicator lamp installed on an outer side of the vehicle.

In the first aspect, the indicator lamp may be an emergency flashing indicator lamp installed in the vehicle.

In the information processing device according to the first aspect, the blinking pattern information may include information which causes at least part of the display screen of the terminal of the user to synchronously blink in the same pattern as the predetermined blinking pattern.

In the first aspect, the processor may be configured to control a blinking color of the information display unit in addition to causing the information display unit to blink in the predetermined blinking pattern, and the blinking pattern information may include color information which causes at least part of the display screen of the terminal of the user of the vehicle to blink in the same color as the blinking color.

In the first aspect, the processor may be configured to cause the information display unit to blink in the predetermined blinking pattern when the user is present at a position where the information display unit is visible.

In the first aspect, the processor may be configured to stop a blinking operation of the information display unit when the user has performed an operation of boarding the vehicle or when the user has boarded the vehicle.

In the first aspect, the processor may be configured to cause the information display unit to blink in the predetermined blinking pattern at an arrival time of a regular transportation system used by the user before using the vehicle, or after a predetermined time has elapsed from the arrival time.

In the first aspect, the processor may be configured to cause the information display unit to blink such that at least one or both of the predetermined blinking pattern and the blinking color are different from blinking patterns and blinking colors of other vehicles present around the vehicle.

In the first aspect, the processor may be configured to change the predetermined blinking pattern according to a distance between the vehicle and the user.

In the first aspect, the processor may be configured to shorten a blinking cycle of the predetermined blinking pattern as the distance between the vehicle and the user decreases.

A second aspect of the disclosure relates to an information processing method that is executed by a computer. The information processing method includes causing an information display unit to blink with a predetermined blinking pattern, and transmitting to a terminal of the user blinking pattern information which causes at least part of a display screen of the terminal of the user to blink in the same pattern as the predetermined blinking pattern. The information display unit is arranged on a vehicle such that a user of the vehicle is able to see the information display unit from outside of the vehicle.

A third aspect of the disclosure relates to a non-temporary storage medium that stores an instruction executable by one or more processors and causing the one or more processors to perform functions. The functions include causing an information display unit to blink with a predetermined blinking pattern, and transmitting to a terminal of the user blinking pattern information which causes at least part of a display screen of the terminal of the user to blink in the same pattern as the predetermined blinking pattern. The information display unit is arranged on a vehicle such that a user of the vehicle is able to see the information display unit from outside of the vehicle.

With each aspect of the present disclosure, the user can easily find the vehicle to be used simply by comparing the blinking pattern of the information display unit of the vehicle with the blinking pattern on the display screen of the terminal of the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When a person moves to a destination, there are usually a plurality of movement routes for moving to the destination, and one movement route is selected from among these movement routes. In this case, as a movement route, a movement route using a plurality of different types of moving bodies, for example, a movement route involving transferring from a regular transportation system to a vehicle may be selected. The present disclosure relates to, for example, an information processing technology that provides information that enables a user to easily find a vehicle to use from among a large number of vehicles at a vehicle boarding/exiting area when the user transfers from a regular transportation system to the vehicle. In this case, vehicles to which the present disclosure is applied include manually driven vehicles, autonomous driving vehicles, private cars, commercial vehicles including taxis, and the like, and regular transportation systems to which the present disclosure is applied include railways such as electric trains, monorails, buses, and airplanes. In the following, the present disclosure will be described by using the example of a case where the vehicle is an autonomous driving taxi and the case where the regular transportation system is a railway such as a train. However, the present disclosure can be applied to manually driven vehicles, autonomous driving vehicles, private vehicles, commercial vehicles including taxis, and the like other than autonomous driving taxis, and it is also applicable to monorails, buses, and airplanes other than railways.

Figure 1:
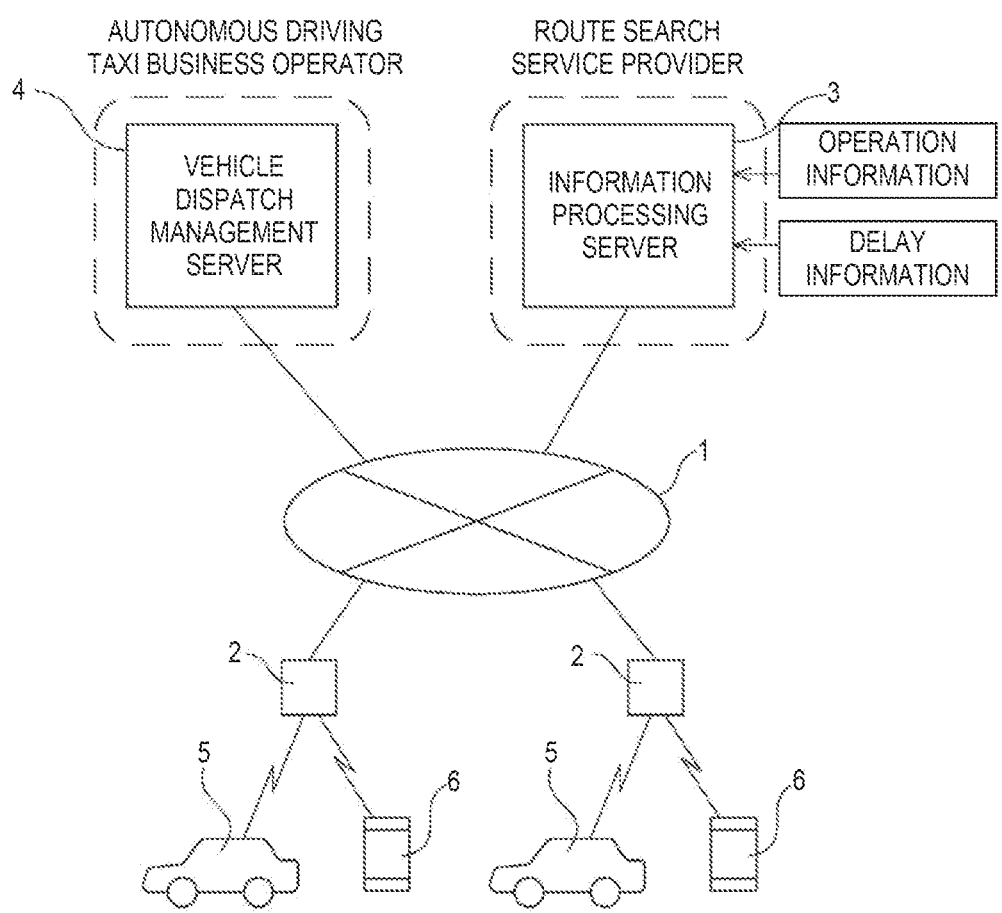
FIG. 1 is an overall view of an information processing system.

FIG. 1 illustrates an overall view of an information processing system suitable for implementing the information processing technology according to the present disclosure. Referring to FIG. 1, reference numeral 1 denotes a communication network, 2 denotes a base station of the communication network 1, 3 denotes an information processing server managed by a route search service provider, 4 denotes a vehicle dispatch management server that is managed by an autonomous driving taxi business operator and provides a vehicle dispatch service for autonomous driving taxis, 5 denotes an autonomous driving taxi, and 6 denotes a terminal owned by a user who uses the vehicle dispatch service of the autonomous driving taxi 5. Although the terminal 6 is depicted as a mobile terminal in FIG. 1, the terminal 6 is not limited to a mobile terminal and may be a stationary terminal.

Figure 2:
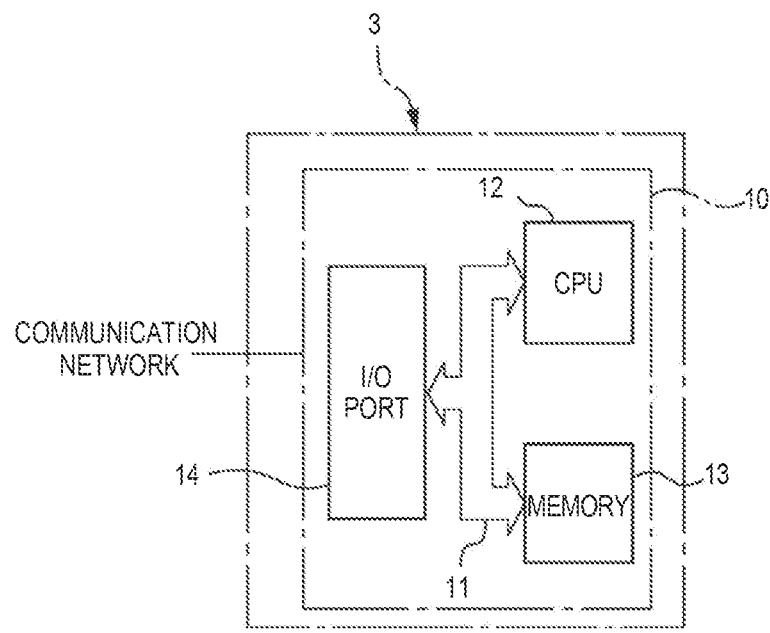
FIG. 2 is a diagram diagrammatically illustrating an information processing server illustrated in FIG. 1.

FIG. 2 illustrates the information processing server 3 illustrated in FIG. 1. Referring to FIG. 2, an electronic control unit 10 is provided within the information processing server 3. The electronic control unit 10 is composed of a digital computer and includes a CPU (microprocessor) 12, a memory 13 composed of ROM and RAM, and an input/output port 14, which are interconnected by a bidirectional bus 11. This electronic control unit 10 is connected to the communication network 1.

Figure 3:
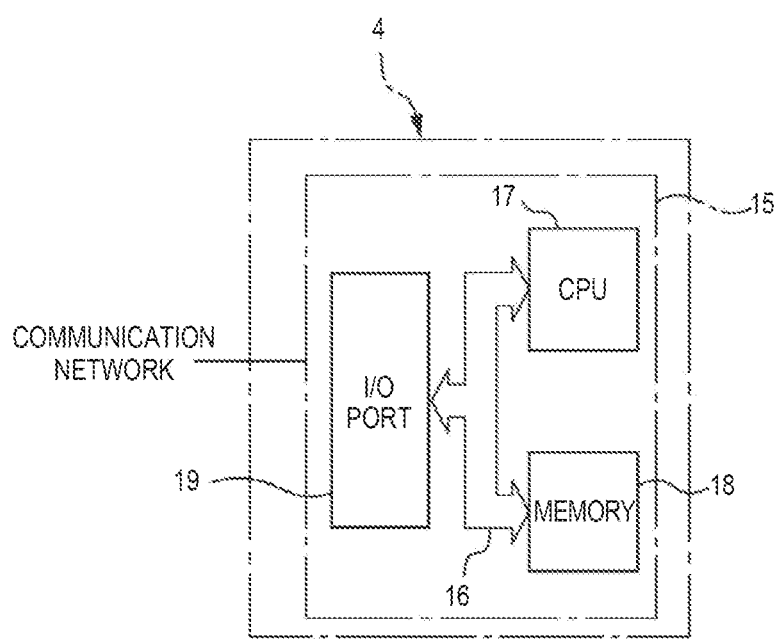
FIG. 3 is a diagram diagrammatically illustrating a vehicle dispatch management server illustrated in FIG. 1.

FIG. 3 illustrates the vehicle dispatch management server 4 illustrated in FIG. 1. Referring to FIG. 3, an electronic control unit 15 is provided in the vehicle dispatch management server 4. The electronic control unit 15 is composed of a digital computer and includes a CPU (microprocessor) 17, a memory 18 composed of ROM and RAM, and an input/output port 19, which are interconnected by a bidirectional bus 16. This electronic control unit 15 is connected to the communication network 1.

Figure 4:
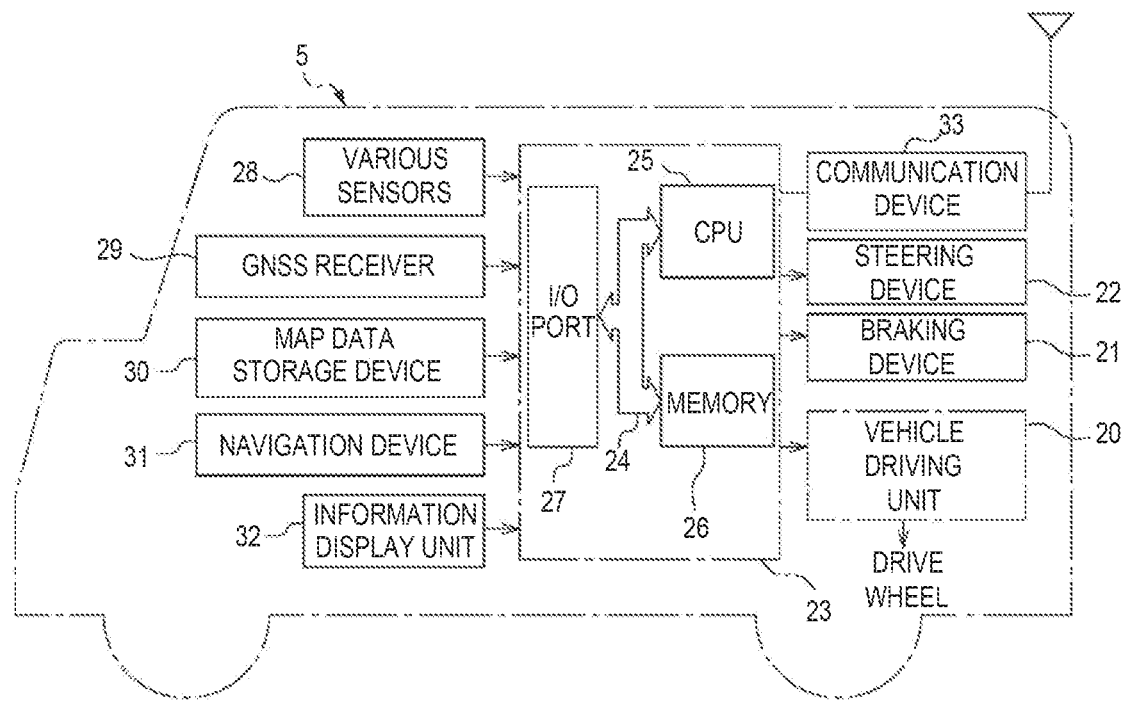
FIG. 4 is a diagram diagrammatically illustrating an autonomous driving taxi.

FIG. 4 diagrammatically illustrates an example of the autonomous driving taxi 5. Referring to FIG. 4, reference numeral 20 denotes a vehicle driving unit designed to apply driving force to drive wheels of the autonomous driving taxi 5, 21 denotes a braking device used to brake the autonomous driving taxi 5, 22 denotes a steering device used to steer the autonomous driving taxi 5, and 23 denotes an electronic control unit mounted inside the autonomous driving taxi 5. As illustrated in FIG. 4, the electronic control unit 23 is composed of a digital computer and includes a CPU (microprocessor) 25, a memory 26 composed of ROM and RAM, and an input/output port 27, which are interconnected by a bidirectional bus 24. In the example illustrated in FIG. 4, the vehicle driving unit 20 is composed of an electric motor driven by a secondary battery or an electric motor driven by a fuel cell, and the drive wheels are driven and controlled by these electric motors according to an output signal from the electronic control unit 23. Braking control of the autonomous driving taxi 5 is performed by the braking device 21 according to an output signal from the electronic control unit 23, and steering control of the autonomous driving taxi 5 is performed by the steering device 22 according to an output signal from the electronic control unit 23. The electronic control unit 23 can be composed of one electronic control unit, or can be composed of a plurality of electronic control units.

As illustrated in FIG. 4, the autonomous driving taxi 5 is equipped with various sensors 28 necessary for the autonomous driving taxi 5 to perform autonomous driving, that is, a sensor that detects the state of the autonomous driving taxi 5 and a surrounding detection sensor that detects the surroundings of the autonomous driving taxi 5. In this case, as sensors for detecting the state of the autonomous driving taxi 5, an acceleration sensor, a speed sensor, and an azimuth angle sensor are used, and as surrounding detection sensors for detecting the surroundings of the autonomous driving taxi 5, an in-vehicle camera that captures the front, side, or rear of the autonomous driving taxi 5, a lidar, a radar, and the like are used. The autonomous driving taxi 5 is also provided with a global navigation satellite system (GNSS) receiver 29, a map data storage device 30, a navigation device 31, and an information display unit 32.

The GNSS receiver 29 can detect the current position (for example, latitude and longitude) of the autonomous driving taxi 5 based on information obtained from a plurality of satellites. Therefore, the current position of the autonomous driving taxi 5 can be acquired from this GNSS receiver 29. As the GNSS receiver 29, for example, a GPS receiver is used. Further, the map data storage device 30 stores map data and the like necessary for the autonomous driving taxi 5 to perform autonomous driving. These various sensors 28, the GNSS receiver 29, the map data storage device 30, the navigation device 31, and the information display unit 32 are connected to the electronic control unit 23. In addition, the autonomous driving taxi 5 is equipped with a communication device 33 for communicating with the information processing server 3 and the vehicle dispatch management server 4 via the base station 2 and the communication network 1.

The terminal 6 owned by a user who uses the vehicle dispatch service is configured to communicate with the information processing server 3, the vehicle dispatch management server 4, and the autonomous driving taxi 5 via the base station 2 and the communication network 1. Thus, in the information processing system illustrated in FIG. 1, the information processing server 3, the vehicle dispatch management server 4, the autonomous driving taxi 5, and the terminal 6 can communicate with each other via the communication network 1. In the example illustrated in FIG. 1, the communication device 33 of the autonomous driving taxi 5 and the terminal 6 each have a short-range wireless communication function, so the communication device 33 of the autonomous driving taxi 5 and the terminal 6 are configured to be able to communicate with each other by these short-range wireless communication functions.

Figure 6:
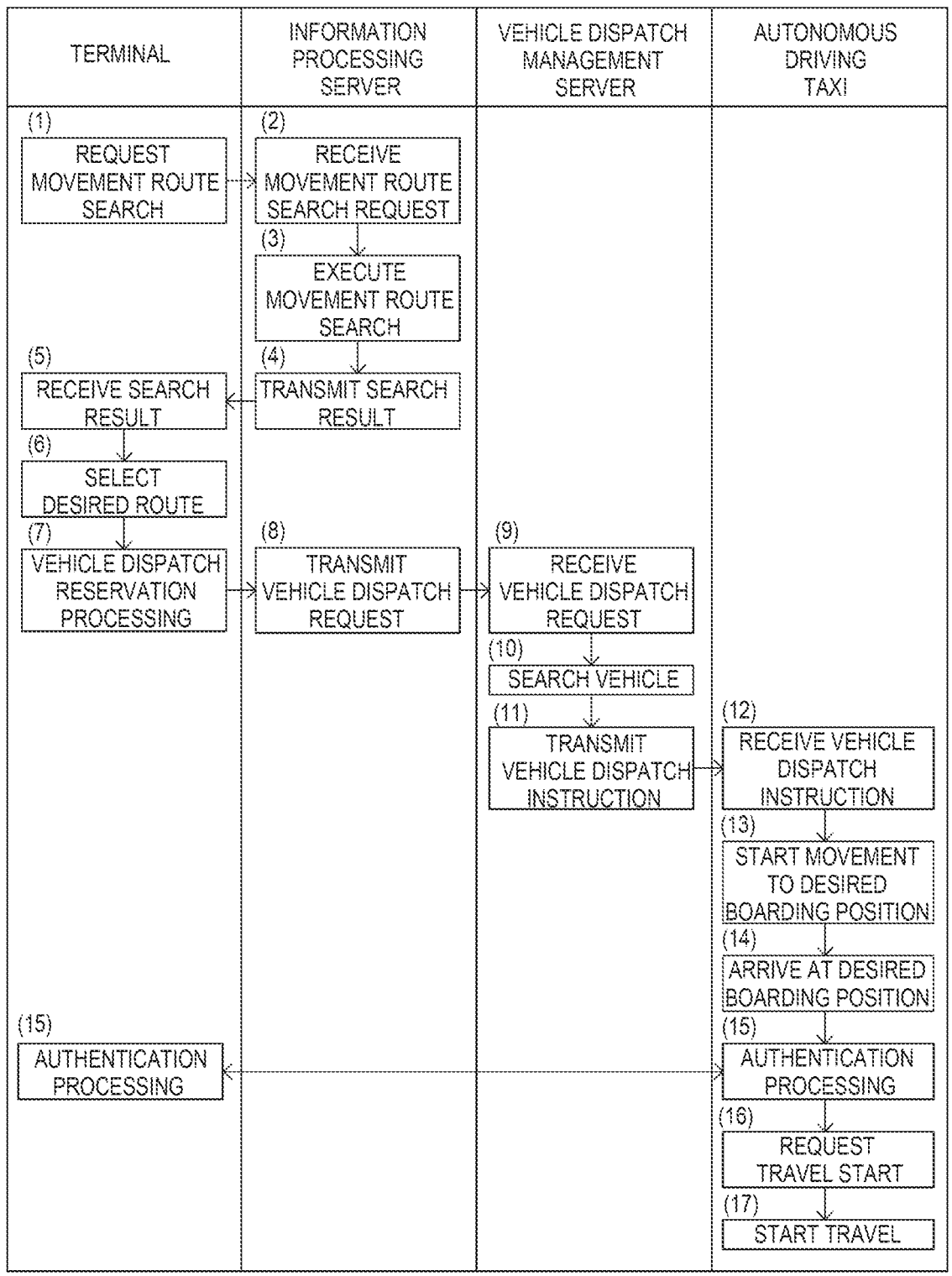
FIG. 6 is a diagram illustrating a basic flow of information processing in the information processing system.

Next, the basic flow of information processing used in an example of the present disclosure will be described with reference to FIG. 6. FIG. 6 illustrates communication between the information processing server 3, the vehicle dispatch management server 4, the autonomous driving taxi 5, and the terminal 6. In addition, FIG. 6 illustrates a case in which a movement route, including a user transferring to the autonomous driving taxi 5 after exiting a regular train, is selected. Here, referring to FIG. 6, in (1), a user who uses the vehicle dispatch service (hereafter referred to simply as a user) inputs the departure place, departure time, destination, desired arrival time at the destination, and the like to the terminal 6 using a movement route search application, and requests a movement route search.

When in (2), the information processing server 3 receives this movement route search request, in (3), the information processing server 3 searches for a movement route that satisfies the request based on the received departure place, departure time, destination, desired arrival time at the destination, and the like. Next, in (4), a movement route search result is transmitted from the information processing server 3 to the terminal 6. When in (5), the terminal 6 receives the movement route search result, in (6), the user selects, on the display screen of the terminal 6, a desired movement route from among the plurality of searched movement routes using a movement route search application.

In addition, it is conceivable that there are cases where the search result of the movement route in (4) does not include the movement route that involves transferring from a regular train to the autonomous driving taxi 5. However, the information processing flow illustrated in FIG. 6 describes a case where the movement route search result in (4) includes a movement route that involves transferring from a regular train to the autonomous driving taxi 5, and further in (6), the movement route involving transferring from the regular train to the autonomous driving taxi 5 is selected as the desired movement route.

Here, when in (6), the movement route involving transferring from the regular train to the autonomous driving taxi 5 is selected, in (7), the user registers desired vehicle dispatch details including the desired boarding position, desired boarding time and desired exiting position regarding the autonomous driving taxi 5 on the display screen of the terminal 6 using the vehicle dispatch reservation application. When the desired vehicle dispatch details are registered, the fact that the vehicle dispatch reservation has been made is transmitted from the terminal 6 to the information processing server 3 together with the registered desired vehicle dispatch details and the desired movement route of the user. When the information processing server 3 receives from the terminal 6 the fact that the vehicle dispatch reservation has been made with the desired vehicle dispatch details and the desired movement route of the user, the received desired vehicle dispatch details and the desired movement route of the user are stored in the memory 13 of the information processing server 3, and in (8), the vehicle dispatch request is transmitted from the information processing server 3 to the vehicle dispatch management server 4. This vehicle dispatch request includes the desired movement route of the user, information on an exiting train station and train arrival time on the desired movement route of the user, the desired vehicle dispatch details consisting of the desired boarding position at the exiting train station, desired boarding time, and desired exiting position regarding the autonomous driving taxi 5, and a user ID for specifying the user. This vehicle dispatch request can include the departure place of the user, departure time, destination, and desired arrival time at the destination received by the information processing server 3 in (2).

When in (9), the vehicle dispatch management server 4 receives the vehicle dispatch request, in (10), the vehicle dispatch management server 4 searches for an autonomous driving taxi 5 that can be dispatched to the desired boarding position of the user at the desired boarding time of the user from among autonomous driving taxis 5 located near the desired boarding position of the user, and an autonomous driving taxi 5 to be dispatched is selected. In this case, search targets can include an autonomous driving taxi 5 in an empty state, and an autonomous driving taxi 5 that is scheduled to become empty close to the desired boarding time of the user according to the reservation information. When the autonomous driving taxi 5 to be dispatched is selected, in (11), a vehicle dispatch instruction is transmitted from the vehicle dispatch management server 4 to the autonomous driving taxi 5 selected for dispatch together with the desired movement route of the user, the information on the exiting train station and train arrival time on the desired movement route of the user, the desired vehicle dispatch details such as the boarding position at the exiting train station, exiting position, and boarding time regarding the autonomous driving taxi 5, and the user ID.

When in (12), the autonomous driving taxi 5 receives the vehicle dispatch instruction, based on the received desired boarding position of the user, a travel route from the current position to the desired boarding position of the user is generated in the electronic control unit 23 of the autonomous driving taxi 5. Then, in (13), autonomous driving of the autonomous driving taxi 5 is started, and the autonomous driving taxi 5 is made to travel along a generated travel route so as to arrive at the desired boarding position of the user at the desired boarding time of the user. Then, when in (14), the autonomous driving taxi 5 arrives at the desired boarding position of the user and the user finds the autonomous driving taxi 5, in (15), user authentication processing is performed between the terminal 6 of the user who made the vehicle dispatch reservation and the autonomous driving taxi 5 using short-range communication. This authentication processing is performed, for example, by collating the user ID stored in the memory 26 of the autonomous driving taxi 5 at the time of the vehicle dispatch request with the user ID stored in the terminal 6 of the user who requested the vehicle dispatch, and when these user IDs match, the user who owns the terminal 6 is authenticated as the user who requested the vehicle dispatch. Various kinds of known authentication processing such as face authentication are known as user authentication processing, and these various kinds of known authentication processing can be used as the authentication processing in (15).

When in (15), the user who owns the terminal 6 is authenticated as the user who requested the vehicle dispatch, the door of the autonomous driving taxi 5 is opened, and the user or some other person board the autonomous driving taxi 5. Next, when a boarding confirmation device installed in the autonomous driving taxi 5 determines that the user or some other person has boarded, the door of the autonomous driving taxi 5 is closed. Next, when in (16), the autonomous driving taxi 5 is requested to start traveling, based on the desired exiting position of the user, a travel route from the current position to the desired exiting position of the user is generated in the electronic control unit 23 of the autonomous driving taxi 5. Next, in (17), automatic driving of the autonomous driving taxi 5 is started.

Next, the configurations of the information processing server 3, the vehicle dispatch management server 4, the autonomous driving taxi 5, and the terminal 6 for executing the information processing flow illustrated in FIG. 6 will be described in order. First, the configuration of the information processing server 3 will be described. The information processing server 3 is formed to be able to communicate with the vehicle dispatch management server 4, the autonomous driving taxi 5, and the terminal 6 via the communication network 1. The information processing server 3 includes a railway information receiving unit capable of receiving railway operation information and railway delay information in real time from a railway business operator via the communication network 1. The information processing server 3 also includes a search request receiving unit that receives a movement route search request from the terminal 6 of the user together with the departure place, departure time, destination, desired arrival time at the destination, and the like. The information processing server 3 also includes a movement route searching unit capable of searching for a plurality of movement routes including multimodal movement routes using at least railways and autonomous driving taxis 5 based on the departure place, departure time, destination, desired arrival time at the destination, and the like received by the search request receiving unit, Further, the information processing server 3 includes a search result transmitting unit designed to transmit a plurality of movement routes searched by the movement route searching unit to the terminal 6 of the user. In addition, the information processing server 3 includes a vehicle dispatch reservation receiving unit that receives from the terminal 6 of the user the desired movement route of the user, as well as the desired vehicle dispatch details consisting of the desired boarding position, desired boarding time, and desired exiting position regarding the autonomous driving taxi 5, and the fact that the vehicle dispatch reservation has been made. In addition, in the information processing server 3, the desired movement route of the user is acquired together with the desired vehicle dispatch details such as the boarding position, exiting position, and boarding time regarding the autonomous driving taxi 5 used by the user on the desired movement route of the user, and information on the exiting train station and train arrival time on the desired movement route of the user. The information processing server 3 includes a vehicle dispatch request transmitting unit that transmits, to the vehicle dispatch management server 4, a vehicle dispatch request including the acquired information such as the desired movement route of the user, desired vehicle dispatch details, exiting train station, and train arrival time. The information processing server 3 also includes an information providing unit that provides the user with various pieces of information other than the plurality of searched movement routes.

Next, the configuration of the vehicle dispatch management server 4 will be described. The vehicle dispatch management server 4 is formed to be able to communicate with the information processing server 3, the autonomous driving taxi 5, and the terminal 6 via the communication network 1. This vehicle dispatch management server 4 includes a vehicle dispatch request receiving unit used to receive from the information processing server 3 the desired movement route of the user, the desired vehicle dispatch details such as the boarding position, exiting position, and boarding time regarding the autonomous driving taxi 5 used by the user, and the information on the exiting train station and train arrival time. In addition, the vehicle dispatch management server 4 includes a vehicle searching unit that searches for an autonomous driving taxi 5 that can be dispatched to the desired boarding position of the user at the desired boarding time of the user from among the autonomous driving taxis 5 that are located near the desired boarding position of the user, and selects the autonomous driving taxi 5 to be dispatched. Further, the vehicle dispatch management server 4 includes a vehicle dispatch instruction transmitting unit designed to transmit the dispatch instruction to the autonomous driving taxi 5 selected for dispatch together with the desired movement route of the user, the desired vehicle dispatch details such as boarding position, exiting position, and boarding time regarding the autonomous driving taxi 5 used by the user, and the information on the exiting train station and train arrival time.

Next, when describing the configuration of the terminal 6, the terminal 6 includes a communication unit used to communicate with the information processing server 3, the vehicle dispatch management server 4, and the autonomous driving taxi 5 via the communication network 1. In addition, the terminal 6 includes a current position acquiring unit, for example, a GPS receiver capable of detecting the current position (for example, latitude and longitude) of the terminal 6. The terminal 6 also has a display screen. The terminal 6 can request a movement route search by inputting the departure place, departure time, destination, desired arrival time at the destination, and the like, using a movement route search application on the display screen of the terminal 6. In addition, the terminal 6 is configured to be able to display a plurality of movement routes searched by the information processing server 3 on the display screen of the terminal 6. The terminal 6 is configured to allow the user to select, on the display screen of the terminal 6, a movement route desired by the user from among a plurality of movement routes searched by the information processing server 3. In addition, the user can make a reservation for dispatching an autonomous driving taxi 5 on the display screen of the terminal 6. In this case, on the display screen of the terminal 6, it is also possible to make a vehicle dispatch reservation request directly to the vehicle dispatch management server 4 using a vehicle dispatch reservation application.

Figure 5:
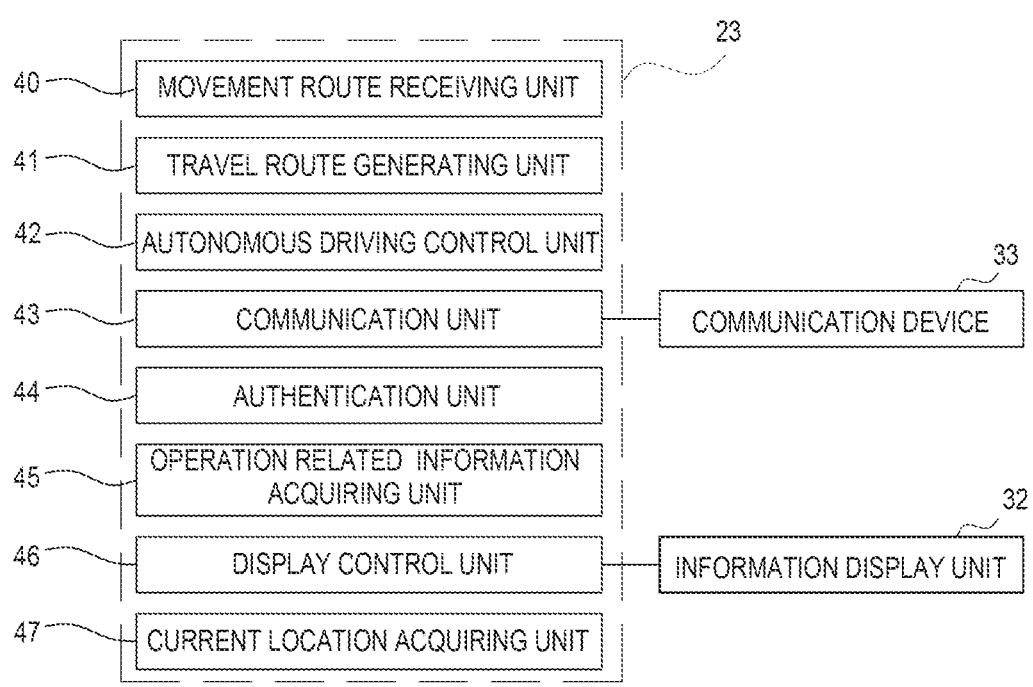
FIG. 5 is a functional configuration diagram of the autonomous driving taxi illustrated in FIG. 4.

Finally, regarding the configuration of the autonomous driving taxi 5, the overall configuration of the autonomous driving taxi 5 has already been described with reference to FIG. 4. Thus, here, various controls executed by the electronic control unit 23 of the autonomous driving taxi 5 will be described with reference to the functional block diagram illustrated in FIG. 5. Referring to FIG. 5, the autonomous driving taxi 5 includes a movement route receiving unit 40, a travel route generating unit 41, an autonomous driving control unit 42, a communication unit 43, an authentication unit 44, an operation related information acquiring unit 45, a display control unit 46, and a current location acquiring unit 47. In one example of the information processing device according to the present disclosure, the communication unit 43 and the display control unit 46 for controlling the information display unit 32 form the information processing device.

Here, in FIG. 5, the movement route receiving unit 40 receives, from the vehicle dispatch management server 4, the movement route desired by the user, the desired vehicle dispatch details such as the boarding position, exiting position, and boarding time regarding the autonomous driving taxi 5 used by the user, the information on the exiting train station and train arrival time, and the like. In this case, the movement route receiving unit 40 can also receive such information from the information processing server 3. The travel route generating unit 41 generates, based on these pieces of information, a travel route of the autonomous driving taxi 5 from the current position to the boarding position desired by the user, and the travel route of the autonomous driving taxi 5 from the boarding position desired by the user to the exiting position desired by the user.

The autonomous driving control unit 42 controls autonomous driving of the autonomous driving taxi 5 along the generated travel route. The communication unit 43 is connected to the communication device 33 and can communicate with the information processing server 3, the vehicle dispatch management server 4, and the terminal 6 through the communication device 33. The authentication unit 44 authenticates that the person who boarded the autonomous driving taxi 5 is the user who made the dispatch reservation for the autonomous driving taxi 5. The operation related information acquiring unit 45 acquires railway operation related information from the information processing server 3. The display control unit 46 is connected to the information display unit 32 arranged on the vehicle such that the user of the autonomous driving taxi 5 can see it from the outside of the autonomous driving taxi 5, and the content displayed on the information display unit 32 is controlled by the display control unit 46. In addition, the current location acquiring unit 47 acquires the current location of the autonomous driving taxi 5 based on the reception data received by the GNSS receiver 29.

Next, an example for executing the basic flow illustrated in FIG. 6 will be described with reference to FIGS. 7 to 14.

Figure 7:
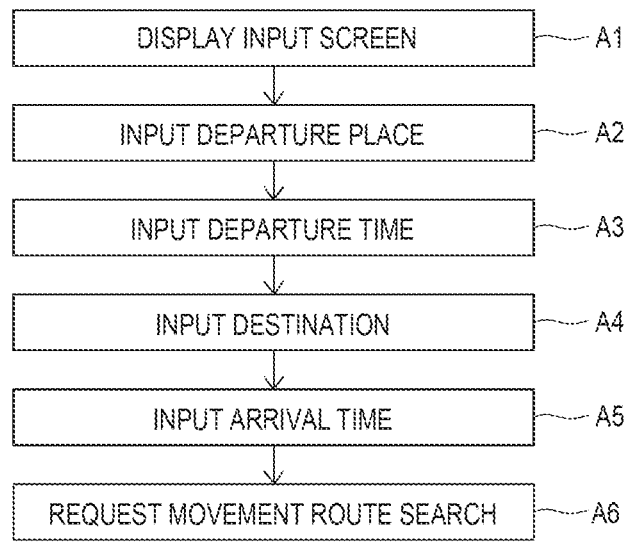
FIG. 7 is a diagram illustrating a procedure for inputting to a terminal.

FIG. 7 illustrates a procedure for inputting to the terminal 6 by the user. Referring to FIG. 7, first, in A1, an input screen for searching a movement route is displayed on the display screen of the terminal 6 using a movement route search application. Next, in A2, for example, the departure place is entered in a departure place entry field of the input screen. In this case, the departure place can also be designated on the map displayed on the display screen of the terminal 6. Next, in A3, the departure time is entered in a departure time entry field of the input screen. Next, in A4, for example, the destination is entered in a destination entry field of the input screen. Also in this case, the destination can be designated on the map displayed on the display screen of the terminal 6. Next, in A5, the desired arrival time to the destination is entered in a desired arrival time entry field of the input screen. Next, in A6, for example, a search request button displayed on the input screen is touched. When the search request button is touched, a movement route search request is transmitted to the information processing server 3 together with the input departure place, departure time, destination, and desired arrival time at the destination.

Figure 8:
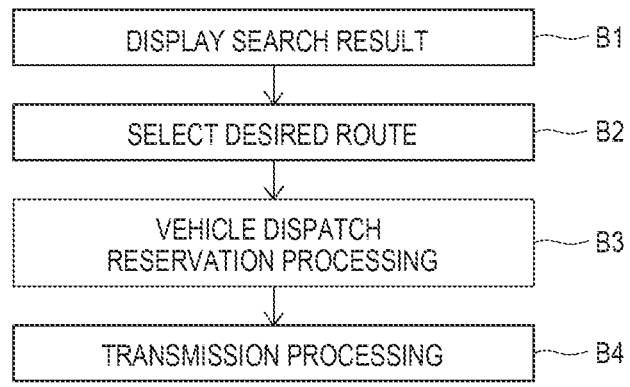
FIG. 8 is a diagram illustrating a route selection procedure in the terminal.

FIG. 8 illustrates a route selection procedure in the terminal 6 by the user. Referring to FIG. 8, first, in B1, a search result of a plurality of movement routes transmitted from the information processing server 3 is displayed on the display screen of the terminal 6. Next, in B2, a desired movement route is selected from among these movement routes. In this case, a description will be given of a case where a movement route involving a transfer from a regular train to an autonomous driving taxi 5 is selected as the desired movement route. When the desired movement route is selected in B2, in B3, on the display screen of the terminal 6, the user registers, using the vehicle dispatch reservation application, the desired vehicle dispatch details consisting of the desired boarding position, desired boarding time, and desired exiting position in the registration fields for the desired boarding position at the exiting train station, desired boarding time, and desired exiting position regarding the autonomous driving taxi 5. In this case as well, the desired boarding position and desired exiting position can be registered by designating the desired boarding position and desired exiting position on the map displayed on the display screen of the terminal 6. When the desired vehicle dispatch details consisting of the desired boarding position, desired boarding time, and desired exiting position are registered, in B4, the terminal 6 transmits to the information processing server 3 the fact that the vehicle dispatch reservation has been made together with the registered desired vehicle dispatch details and the desired movement route of the user.

Figure 9:
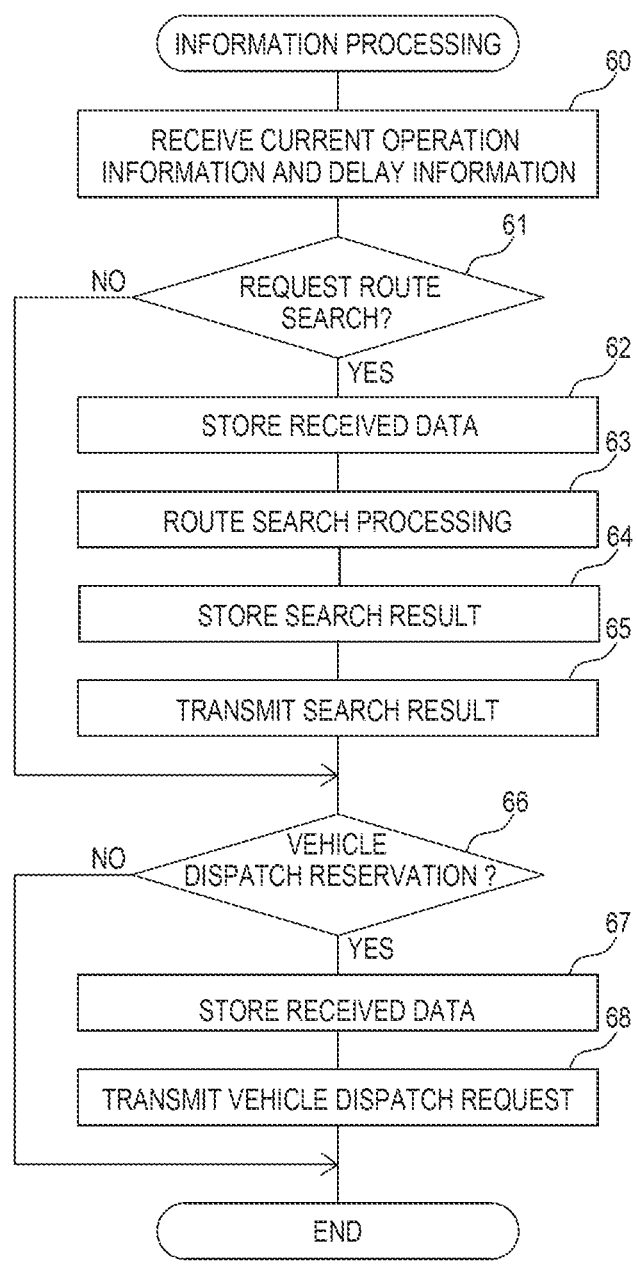
FIG. 9 is a flowchart for performing the information processing.

FIG. 9 illustrates an information processing routine executed in the electronic control unit 10 of the information processing server 3, and this routine is repeatedly executed.

Referring to FIG. 9, first, in step 60, current railway operation information and current railway delay information are received from the railway business operator, and the received current railway operation information and current railway delay information are stored in the memory 13 of the electronic control unit 10.

In step 61, it is determined whether a movement route search request has been received from the terminal 6. When it is determined that a movement route search request has been received from the terminal 6, the process proceeds to step 62, and the received data such as the departure place of the user, departure time, destination, desired arrival time at the destination, and the like received together with the movement route search request are stored in the memory 13 of the electronic control unit 10. Next, in step 63, a search is made for a plurality of movement routes that satisfy the requirements of the user. Next, in step 64, a movement route search result is stored in the memory 13 of the electronic control unit 10. Next, in step 65, the movement route search result is transmitted to the terminal 6. Next, the process proceeds to step 66. On the other hand, when it is determined in step 61 that the movement route search request has not been received from the terminal 6, the process jumps to step 66.

In step 66, it is determined whether the information processing server 3 has received from the terminal 6 the fact that the vehicle dispatch reservation has been made together with the desired boarding position at the exiting train station, desired boarding time, and desired exiting position regarding the autonomous driving taxi 5, and desired movement route of the user. When it is determined that the information processing server 3 has received a vehicle dispatch reservation from the terminal 6, the process proceeds to step 67, and the received desired boarding position, desired boarding time, desired exiting position, and desired movement route of the user are stored in the memory 13 of the electronic control unit 10. Next, in step 68, a vehicle dispatch request including the desired movement route of the user, information on an exiting train station and train arrival time on the desired movement route of the user, the desired boarding position, desired boarding time, and desired exiting position regarding the autonomous driving taxi 5, and a user ID for specifying the user is transmitted to the vehicle dispatch management server 4. On the other hand, when it is determined in step 66 that the vehicle dispatch reservation has not been received from the terminal 6, the processing cycle ends.

Figure 10:
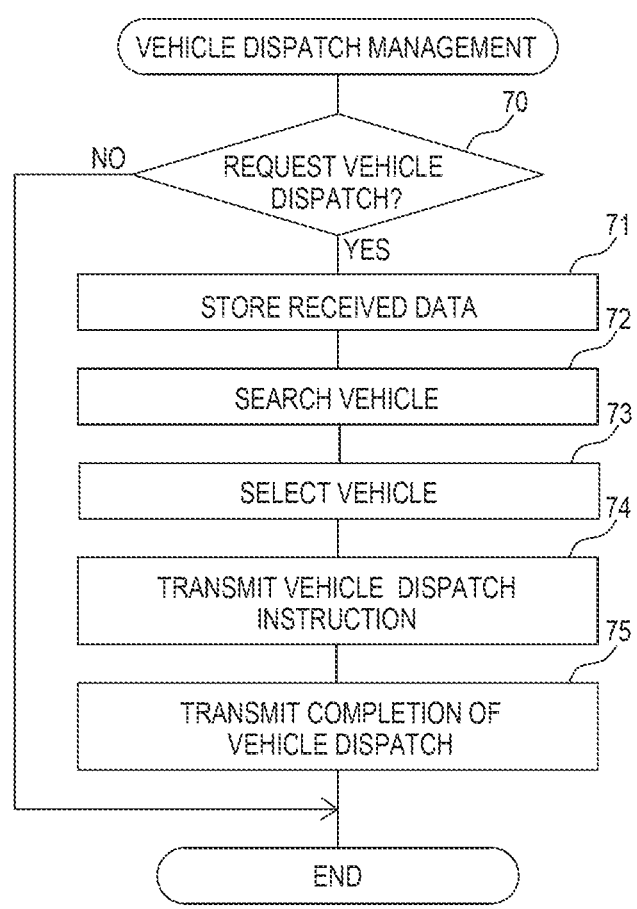
FIG. 10 is a flowchart for vehicle dispatch management.

FIG. 10 illustrates a vehicle dispatch management routine executed in the electronic control unit 15 of the vehicle dispatch management server 4, and this routine is repeatedly executed.

Referring to FIG. 10, first, in step 70, it is determined whether a vehicle dispatch request has been received from the information processing server 3. When it is determined that the vehicle dispatch request has not been received from the information processing server 3, the processing cycle ends. On the other hand, when it is determined that a vehicle dispatch request has been received from the information processing server 3, the process proceeds to step 71, and the received data such as the received desired movement route of the user, information on the exiting train station and train arrival time on the desired movement route of the user, the desired boarding position at the exiting train station, desired boarding time, and desired exiting position regarding the autonomous driving taxi 5, and a user ID is stored in the memory 18 of the electronic control unit 15.

Next, in step 72, an autonomous driving taxi 5 that can be dispatched to the desired boarding position of the user at the desired boarding time of the user is searched for from among the autonomous driving taxis 5 located near the desired boarding position of the user. In this case, search targets can include an autonomous driving taxi 5 in an empty state, and an autonomous driving taxi 5 that is scheduled to become empty close to the desired boarding time of the user according to the reservation information. Next, in step 73, an autonomous driving taxi 5 to be dispatched is selected from among the autonomous driving taxis 5 as search targets. When the autonomous driving taxi 5 to be dispatched is selected, in step 74, a vehicle dispatch instruction is transmitted from the vehicle dispatch management server 4 to the autonomous driving taxi 5 selected for dispatch together with the desired movement route of the user, information on the exiting train station and train arrival time on the desired movement route of the user, the desired vehicle dispatch details such as the desired boarding position, desired exiting position, and desired boarding time regarding the autonomous driving taxi 5, and the user ID. Next, in step 75, the fact that the vehicle dispatch has been completed is transmitted to the terminal 6.

Figure 11:
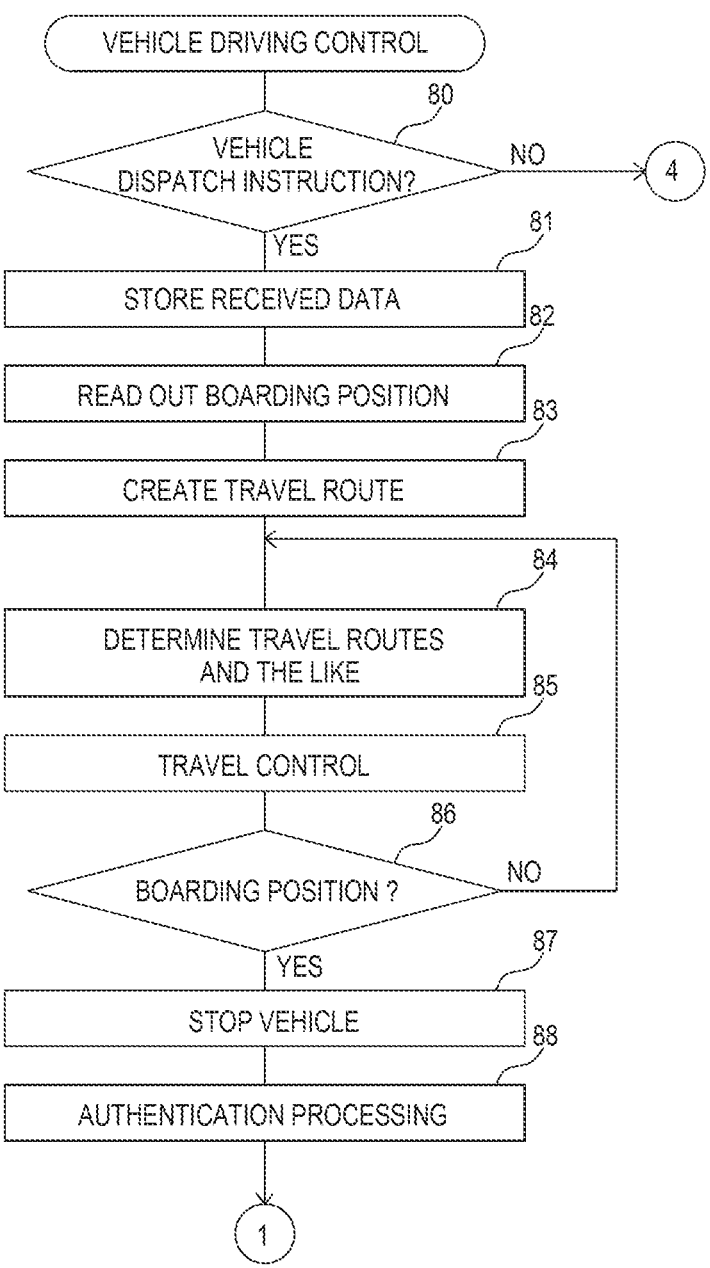
FIG. 11 is a flowchart for controlling an operation of the autonomous driving taxi.
Figure 12:
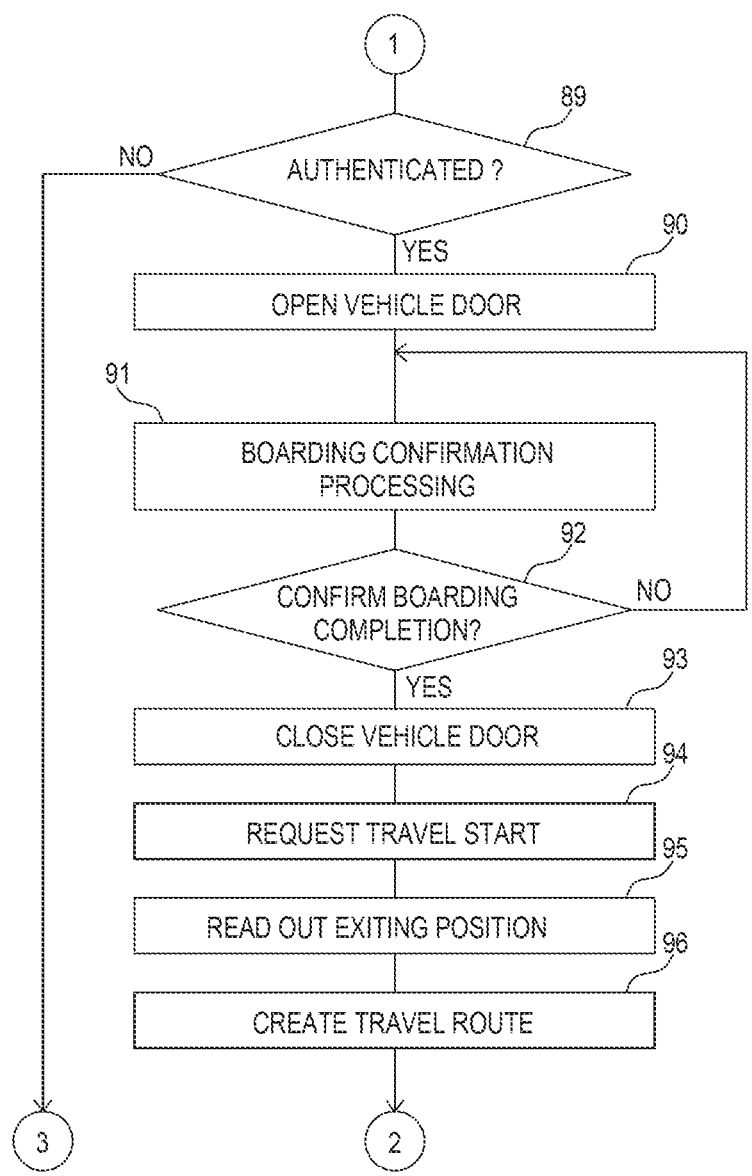
FIG. 12 is a flowchart for controlling the operation of the autonomous driving taxi.
Figure 13:
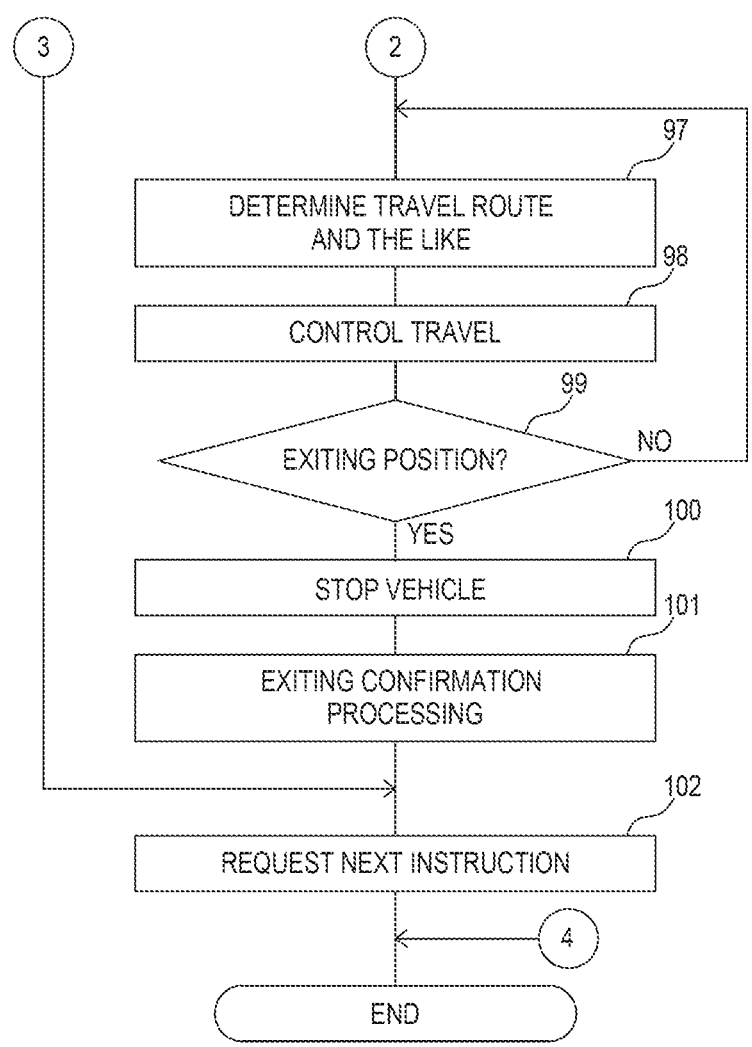
FIG. 13 is a flowchart for controlling the operation of the autonomous driving taxi.

FIGS. 11 to 13 illustrate a driving control routine for the autonomous driving taxi executed in the electronic control unit 23 of the autonomous driving taxi 5 selected for dispatch, and this routine is repeatedly executed.

Referring to FIGS. 11 to 13, first, in step 80, it is determined whether a vehicle dispatch instruction has been received from the vehicle dispatch management server 4. When it is determined that no vehicle dispatch instruction has been received from the vehicle dispatch management server 4, the processing cycle ends. On the other hand, when it is determined that a vehicle dispatch instruction has been received from the vehicle dispatch management server 4, the process proceeds to step 81, and received data such as the received desired movement route of the user, information on the exiting train station and train arrival time on the desired movement route of the user, the desired boarding position at the exiting train station, desired boarding time, and desired exiting position regarding the autonomous driving taxi 5, and the user ID is stored in the memory 26 of the electronic control unit 23.

Next, in step 82, the desired boarding position of the user is read out from the memory 26. Next, in step 83, the navigation device 31 creates a travel route for the autonomous driving taxi 5 from the current position to the desired boarding position of the user based on the current position of the autonomous driving taxi 5 acquired by the GNSS receiver 29 and the desired boarding position of the user read out from the memory 26. Next, in step 84, the travel route and travel speed of the autonomous driving taxi 5 that do not come into contact with other vehicles or pedestrians are determined based on detection results obtained from sensors such as a camera that captures the front of the autonomous driving taxi 5, a lidar and a radar. Next, in step 85, travel control of the autonomous driving taxi 5 is performed according to the determined travel route and travel speed.

Next, in step 86, it is determined whether the autonomous driving taxi 5 has reached the desired boarding position of the user. When it is determined that the autonomous driving taxi 5 has not reached the desired boarding position of the user, the process returns to step 84 and the autonomous driving taxi 5 continues to drive autonomously. On the other hand, when it is determined in step 86 that the autonomous driving taxi 5 has reached the desired boarding position of the user, the process proceeds to step 87, and the autonomous driving taxi 5 comes to a stop. Next, in step 88, user authentication processing is performed between the terminal 6 of the user who made the vehicle dispatch reservation and the autonomous driving taxi 5 using short-range communication. This authentication processing is performed, for example, by collating the user ID stored in the memory 26 of the autonomous driving taxi 5 at the time of the vehicle dispatch request with the user ID stored in the terminal 6 of the user who requested the vehicle dispatch, and when these user IDs match, the user who owns the terminal 6 is authenticated as the user who requested the vehicle dispatch. Various kinds of known authentication processing such as face authentication can also be used as the authentication processing in step 88.

Next, in step 89, it is determined whether the user who owns the terminal 6 has been authenticated as the user who requested the vehicle dispatch in the authentication processing in step 88. In the authentication processing, when the user who owns the terminal 6 is not authenticated as the user who requested the vehicle dispatch, the process jumps to step 102 to request the vehicle dispatch management server 4 to instruct the next operation. In this case, the autonomous driving taxi 5 is autonomously driven toward a desired boarding position of the other user who requested vehicle dispatch. On the other hand, in the authentication processing, when the user who owns the terminal 6 is authenticated as the user who requested the vehicle dispatch, the process proceeds to step 90 and the door of the autonomous driving taxi 5 is opened. When the door of the autonomous driving taxi 5 is opened, the user who has requested the vehicle dispatch boards the autonomous driving taxi 5 alone or several people including the user who has requested the vehicle dispatch board the autonomous driving taxi 5.

Next, in step 91, boarding confirmation processing is performed to confirm the completion of boarding the autonomous driving taxi 5 by the user who requested the vehicle dispatch, or by several people including the user who requested the vehicle dispatch. This boarding confirmation processing is performed by a boarding confirmation device installed in the autonomous driving taxi 5, for example, by analyzing an image captured by a boarding confirmation camera that captures the vehicle cabin. Next, in step 92, it is determined whether the completion of boarding of the autonomous driving taxi 5 by the user who requested the vehicle dispatch or by several people including the user who requested the vehicle dispatch has been confirmed. When it is determined that the completion of boarding has not been confirmed, the process returns to step 91 to continue boarding confirmation processing for confirming boarding completion. On the other hand, when it is determined in step 92 that the completion of boarding has been confirmed, the process proceeds to step 93.

In step 93, the door of the autonomous driving taxi 5 is closed. When the door of the autonomous driving taxi 5 is closed, the process proceeds to step 94, and a travel start request is made for the autonomous driving taxi 5. The travel start request for the autonomous driving taxi 5 is made, for example, by the user who boarded the taxi by touching a travel start button displayed on a display screen installed in the autonomous driving taxi 5. When the travel start request is made for the autonomous driving taxi 5, the process proceeds to step 95, and the desired exiting position of the user is read out from the memory 26. Next, in step 96, the navigation device 31 creates a travel route for the autonomous driving taxi 5 from the current position to the desired exiting position of the user based on the current position of the autonomous driving taxi 5 acquired by the GNSS receiver 29 and the desired exiting position of the user read out from the memory 26.

Next, in step 97, the travel route and travel speed of the autonomous driving taxi 5 that do not come into contact with other vehicles or pedestrians are determined based on the detection results obtained from sensors such as a camera that captures the front and the like of the autonomous driving taxi 5, a lidar, and, a radar. Next, in step 98, travel control of the autonomous driving taxi 5 is performed according to the determined travel route and travel speed. Next, in step 99, it is determined whether the autonomous driving taxi 5 has reached the desired exiting position of the user. When it is determined that the autonomous driving taxi 5 has not reached the desired exiting position of the user, the process returns to step 97, and the autonomous driving taxi 5 continues to drive autonomously. On the other hand, when it is determined in step 99 that the autonomous driving taxi 5 has reached the desired exiting position of the user, the process proceeds to step 100, and the autonomous driving taxi 5 comes to a stop.

Next, in step 101, exiting confirmation processing for confirming completion of exiting from the autonomous driving taxi 5 by the user or several people including the user on board is performed. This exiting confirmation processing is performed by an exiting confirmation device installed in the autonomous driving taxi 5, for example, by analyzing an image captured by an exiting confirmation camera that captures the vehicle cabin. Next, in step 102, the vehicle dispatch management server 4 is requested for an instruction on the next operation.

Here, as described above, the autonomous driving taxi 5 dispatched to the user is autonomously driven to the desired boarding position of the user, and when the autonomous driving taxi 5 reaches the desired boarding position of the user, the autonomous driving taxi 5 comes to a stop at the desired boarding position of the user. However, when the autonomous driving taxi 5 reaches the desired boarding position of the user, there are many cases where many other autonomous driving taxis are present around the autonomous driving taxi 5 dispatched to the user. In such a case, it can be said that it is quite difficult for the user to find the autonomous driving taxi dispatched to the user from among these autonomous driving taxis.

Therefore, in an example according to the present disclosure, when the autonomous driving taxi 5 dispatched to the user reaches the desired boarding position of the user or approaches the desired boarding position of the user, on the one hand, the information display unit 32 arranged on the vehicle of the autonomous driving taxi 5 blinks in a predetermined blinking pattern, and on the other hand, this blinking pattern information is transmitted to the terminal of the user such that at least part of the display screen of the terminal of the user blinks in the same pattern as this blinking pattern, and as such the user can easily find the autonomous driving taxi 5 dispatched to the user by simply confirming that the blinking pattern of the information display unit 32 of the autonomous driving taxi 5 matches the blinking pattern on the display screen of the terminal of the user. Hereinafter, an example according to the present disclosure will be described with reference to FIGS. 14 to 32, using the example of a case of transferring from a regular train to an autonomous driving taxi 5.

Figure 14:
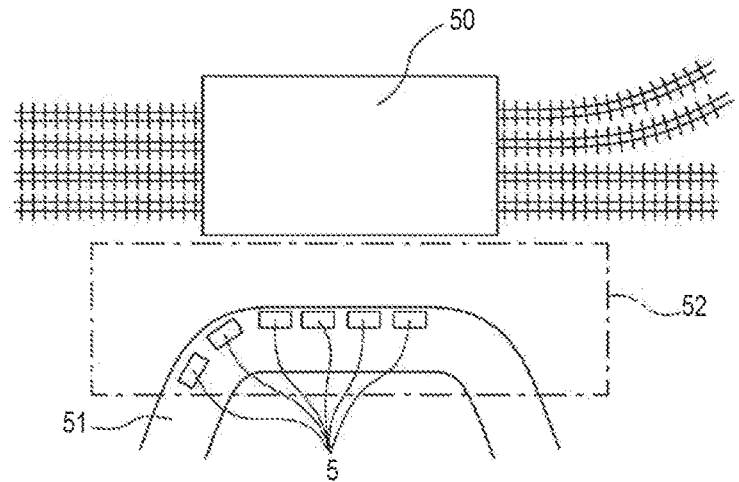
FIG. 14 is a diagram diagrammatically illustrating a road map.

First, referring to FIG. 14, FIG. 14 diagrammatically illustrates an example of a road map including arrival and departure platforms of trains such as train stations. In FIG.

14, reference numeral 50 denotes an arrival and departure platform of train, that is, a train station, 51 denotes a portion of a road, and 52 denotes a boarding/exiting platform of a car. In addition, FIG. 14 illustrates a case where a large number of autonomous driving taxis 5 are present at the boarding/exiting platform 52. In the following, each example will be described in sequence, using the example of a case where the desired boarding position of the user is within the boarding/exiting platform 52 area.

Figure 15A:
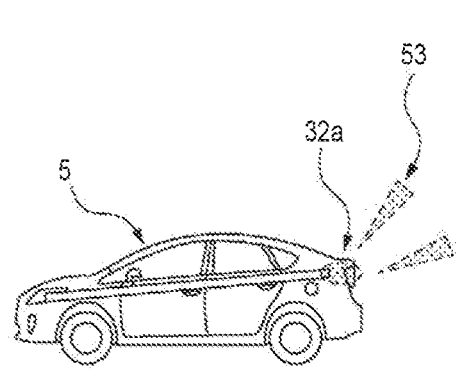
FIG. 15A is a side view of the autonomous driving taxi.

FIG. 15A illustrates a side view of the autonomous driving taxi 5. In the example illustrated in FIG. 15A, the case where the information display unit 32 arranged on the vehicle of the autonomous driving taxi 5 so as to be visible from the outside of the vehicle is configured by an emergency flashing indicator lamp, that is, a hazard lamp arranged on the rear face of the vehicle is illustrated. In addition, this information display unit 32 can be configured by an indicator lamp installed on the roof of the vehicle of the autonomous driving taxi 5, on the front face of the vehicle, on the side face of the vehicle, or on the rear face of the vehicle. In addition, the information display unit 32 can be configured by an information display body which is installed on the roof of the vehicle, the front face of the vehicle, the side face of the vehicle, or the rear face of the vehicle and is illuminated by an illumination lamp. Each example will be described below by using the example of a case where the information display unit 32 is an emergency flashing indicator lamp arranged on the rear face of the vehicle. However, as described above, the information display unit 32 can be the above-described indicator lamp or the information display body illuminated by the above-described illumination lamp.

In addition, in FIG. 15A, a FIG. 53 representing light emitted from the emergency flashing indicator lamp 32a (hereinafter simply referred to as the indicator lamp 32a) toward the rear of the vehicle indicates that the indicator lamp 32a is blinking in a certain predetermined blinking pattern A. The blinking pattern A illustrated in FIG. 15A is a blinking pattern different from the blinking pattern of general hazard lamps. For example, in blinking pattern A, the blinking cycle of the indicator lamp 32a is shortened to the extent that it can be distinguished from a hazard lamp, or long enough to be distinguished from a hazard lamp, compared to the blinking cycle of a general hazard lamp. Further, for example, the blinking pattern A may be a blinking pattern in which the left indicator lamp 32a and the right indicator lamp 32a alternately blink when viewed from the rear of the vehicle. In the example illustrated in FIG. 15A, the color of the blinking light emitted from the indicator lamp 32a is yellow.

Figure 15B:
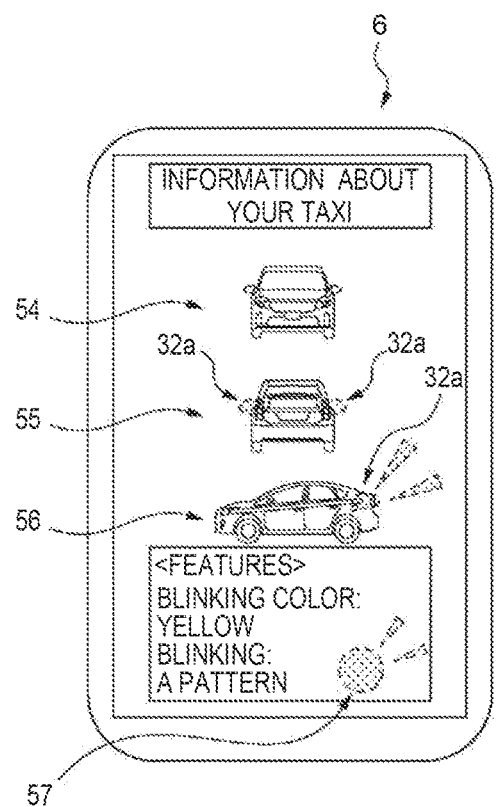
FIG. 15B is a diagram illustrating a display screen of a mobile terminal.

Here, in the example illustrated in FIGS. 15A and 15B, in FIG. 14, when the user is at the desired boarding position of the user, that is, within the boarding/exiting platform 52 area, shortly before the autonomous driving taxi 5 arrives at the boarding/exiting platform 52, for example, when a predicted arrival time t until the autonomous driving taxi 5 arrives at the desired boarding position of the user is less than a preset time tX, the indicator lamp 32a begins blinking with the blinking pattern A to emit a yellow blinking light as illustrated in FIG. 15A. On the other hand, in this case, the blinking pattern information such as the blinking cycle of the indicator lamp 32a and the color of the light emitted from the indicator lamp 32a and the information on the autonomous driving taxi 5 are transmitted from the autonomous driving taxi 5 to the mobile terminal 6 of the user, and in this case, information on the autonomous driving taxi 5 and blinking pattern information as illustrated in FIG. 15B are displayed on the display screen of the mobile terminal 6 of the user.

In this case, in the example illustrated in FIG. 15B, on the display screen of the mobile terminal 6 of the user, a front shape 54, a rear shape 55, and a side shape 56 of the autonomous driving taxi 5 are displayed in a row in order from the top, and on the display screen of this mobile terminal 6, an indicator lamp 32a on the screen corresponding to the indicator lamp 32a of the autonomous driving taxi 5 illustrated in FIG. 15A synchronously blinks with the same blinking cycle and light color as the indicator lamp 32a of the autonomous driving taxi 5 illustrated in FIG. 15A. Further, on the display screen of the mobile terminal 6 of the user, a circular blinking area 57 is set that blinks with the color of the light emitted from the indicator lamp 32a, and this circular blinking area 57 blinks in synchronization with the same blinking cycle as the indicator lamp 32a of the autonomous driving taxi 5 illustrated in FIG. 15A. In FIG. 15B, the portion of the characters "Pattern A" on the display screen of the mobile terminal 6 is displayed as "0.5 sec cycle", for example.

Thus, in the example illustrated in FIGS. 15A and 15B, shortly before the autonomous driving taxi 5 arrives at the boarding/exiting platform 52, for example, when the predicted arrival time t until the autonomous driving taxi 5 arrives at the desired boarding position of the user is less than the preset time tX, the indicator lamp 32a of the autonomous driving taxi 5 starts blinking with a yellow light with the blinking pattern A as illustrated in FIG. 15A, and at the same time, on the display screen of the mobile terminal 6 of the user, the indicator lamp 32a on the screen corresponding to the indicator lamp 32a of the autonomous driving taxi 5 illustrated in FIG. 15A and the circular blinking area 57 blink in synchronization with the same blinking cycle and light color as the indicator lamp 32a of the autonomous driving taxi 5 illustrated in FIG. 15A. Therefore, the user only confirms that the blinking cycle and blinking color of the indicator lamp 32a of the autonomous driving taxi 5 and the blinking cycle and blinking color of the indicator lamp 32a and the circular blinking area 57 on the display screen of the mobile terminal 6 of the user are the same, and as such the user can easily find the autonomous driving taxi 5 dispatched to the user from among many autonomous driving taxis 5.

The blinking operation of the indicator lamp 32a of the autonomous driving taxi 5 and the blinking operation of the indicator lamp 32a and the circular blinking area 57 on the display screen of the mobile terminal 6 of the user are then stopped when the user finds the autonomous driving taxi 5 dispatched to the user. In this case, for example, the blinking operation of the indicator lamp 32a of the autonomous driving taxi 5 and the blinking operation of the indicator lamp 32a and the circular blinking area 57 on the display screen of the mobile terminal 6 of the user are stopped when the user boards the autonomous driving taxi 5 dispatched to the user.

Figure 16:
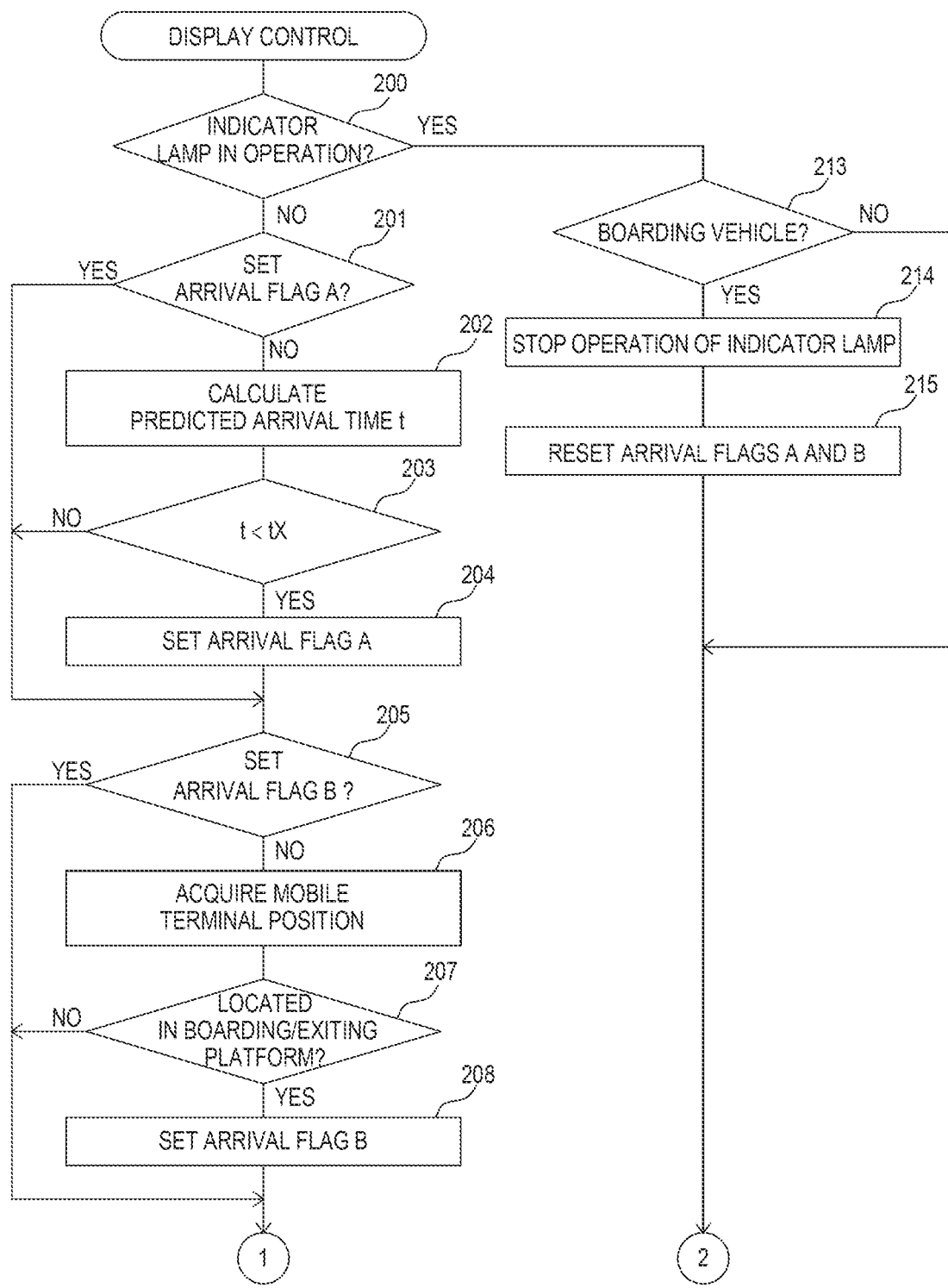
FIG. 16 is a flowchart for performing display control.
Figure 17:
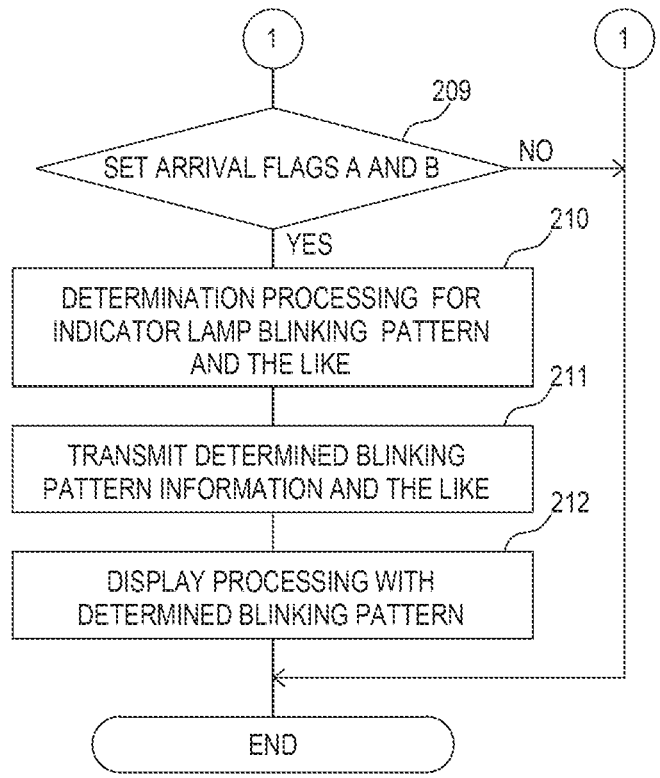
FIG. 17 is a flowchart for performing the display control.

FIGS. 16 and 17 illustrate a display control routine for executing the example illustrated in FIGS. 15A and 15B. This routine is executed by being interrupted at regular time intervals in the electronic control unit 23 of the autonomous driving taxi 5 selected for dispatch.

Referring to FIGS. 16 and 17, first, in step 200, it is determined whether the indicator lamp 32a of the autonomous driving taxi 5 is blinking according to the blinking pattern. When it is determined that the indicator lamp 32a of the autonomous driving taxi 5 is not blinking according to the blinking pattern, the process proceeds to step 201, and it is determined whether an arrival flag A indicating that the autonomous driving taxi 5 has arrived at the desired boarding position of the user is set. When it is determined that the arrival flag A is set, the process jumps to step 205. On the other hand, when it is determined that the arrival flag A is not set, the process proceeds to step 202, where the navigation device 31 calculates the predicted arrival time t until the autonomous driving taxi 5 reaches the desired boarding position of the user. Next, in step 203, it is determined whether this predicted arrival time t is less than the preset time tX.

When it is determined in step 203 that this predicted arrival time t is not less than the preset time tX, the process jumps to step 205. On the other hand, when it is determined that the predicted arrival time t is less than the preset time tX, the process proceeds to step 204 and the arrival flag A is set. Next, the process proceeds to step 205. In this way, in this example, the arrival flag A is set when the predicted arrival time t until the autonomous driving taxi 5 arrives at the desired boarding position of the user is less than the preset time tX.

In step 205 it is determined whether an arrival flag B is set indicating that the user is within the boarding/exiting platform 52 area. When it is determined that the arrival flag B is set, the process jumps to step 209. On the other hand, when it is determined that the arrival flag B is not set, the process proceeds to step 206 to contact the mobile terminal 6 of the user to acquire the current position (for example, latitude and longitude) of the mobile terminal 6 detected by the GPS receiver. Next, in step 207, it is determined whether this mobile terminal 6 is located within the boarding/exiting platform 52 area, that is, whether the user is within the boarding/exiting platform 52 area.

The process jumps to step 209 when it is determined in step 207 that the user is not within the boarding/exiting platform 52 area. On the other hand, when it is determined that the user is within the boarding/exiting platform 52 area, the process proceeds to step 208 and the arrival flag B is set. Next, the process proceeds to step 209. In this way, in this example, the arrival flag B is set when it is determined that the mobile terminal 6 is located within the boarding/exiting platform 52 area, that is, when it is determined that the user is within the boarding/exiting platform 52 area.

In step 209, it is determined whether both the arrival flag A and the arrival flag B are set. When it is determined that both the arrival flag A and the arrival flag B are not set, the processing cycle ends. On the other hand, when it is determined that both the arrival flag A and the arrival flag B are set, that is, when it is determined that the predicted arrival time t until the autonomous driving taxi 5 arrives at the desired boarding position of the user is less than the preset time tX and the user is located within the boarding/exiting platform 52 area, the process proceeds to step 210, and the blinking pattern of the indicator lamp 32a of the autonomous driving taxi 5 and the like are determined. In this case, in this example, the blinking pattern of the indicator lamp 32a is set to the blinking pattern A, and the blinking color is yellow. Next, in step 211, the blinking pattern information on the determined blinking cycle of the indicator lamp 32a, the determined color of the light of the indicator lamp 32a, and the like, and the information on the autonomous driving taxi 5 are transmitted to the mobile terminal 6 of the user. Next, in step 212, the indicator lamp 32a of the autonomous driving taxi 5 blinks with yellow light with the blinking pattern A, as illustrated in FIG. 15A.

Figure 18:
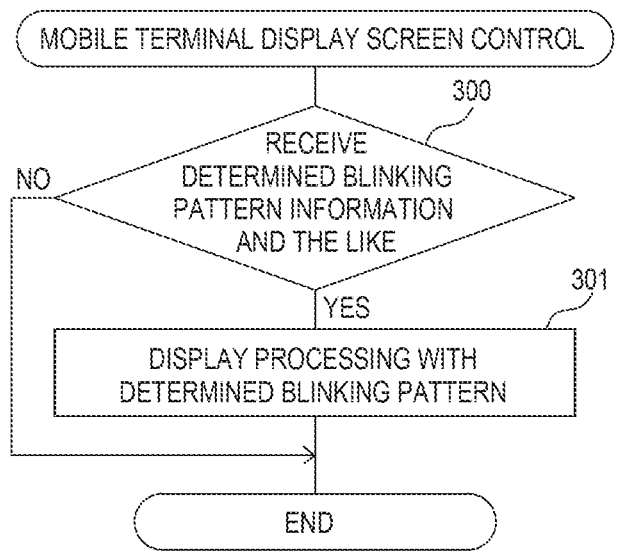
FIG. 18 is a flowchart for controlling the display screen of the mobile terminal.

Here, referring to the mobile terminal display screen control routine of FIG. 18 executed in the mobile terminal 6 of the user, in step 300, it is determined whether the blinking pattern information on the blinking cycle of the indicator lamp 32a, the color of the light of the indicator lamp 32a, and the like, and the information on the autonomous driving taxi 5 transmitted in step 211 of FIG. 17 have been received. Then, when it is determined that these pieces of information are received, the process proceeds to step 301 to display the blinking pattern information of the indicator lamp 32a as illustrated in FIG. 15B on the display screen of the mobile terminal 6 of the user. In this way, when the predicted arrival time t until the autonomous driving taxi 5 arrives at the desired boarding position of the user is less than the preset time tX, and the user is located within the boarding/exiting platform 52 area, as illustrated in FIG. 15A, the indicator lamp 32a of the autonomous driving taxi 5 blinks with yellow light with the blinking pattern A, and as illustrated in FIG. 15B, the blinking pattern information of the indicator lamp 32a is displayed on the display screen of the mobile terminal 6 of the user.

Returning again to FIGS. 16 and 17, when it is determined in step 200 that the indicator lamp 32a of the autonomous driving taxi 5 is blinking according to the blinking pattern, the process proceeds to step 213 to determine whether the user or the like has performed the operation of boarding the autonomous driving taxi 5, or whether he or she has boarded. In this case, for example, in step 89 of the driving control routine for the autonomous driving taxi illustrated in FIGS. 11 to 13, when it is determined that the user who owns the terminal 6 has been authenticated as the user who requested the vehicle dispatch, or when the door of the autonomous driving taxi 5 is opened in step 90 of the driving control routine for the autonomous driving taxi illustrated in FIGS. 11 to 13, it is determined that the user or the like has performed the operation of boarding the autonomous driving taxi 5. In addition, in step 92 of the driving control routine for the autonomous driving taxi illustrated in FIGS. 11 to 13, it is determined that the user or the like has boarded the autonomous driving taxi 5 when it is determined that boarding has been completed. When it is determined that the user or the like has not performed the operation of boarding the autonomous driving taxi 5 and has not boarded, the processing cycle ends. On the other hand, when it is determined that the user or the like has performed the operation of boarding the autonomous driving taxi 5 or has boarded the autonomous driving taxi 5, the process proceeds to step 214, and the blinking operation of the indicator lamp 32a of the autonomous driving taxi 5 and the display of the blinking pattern information of the indicator lamp 32a on the display screen of the mobile terminal 6 of the user are stopped. Next, in step 215, the arrival flag A and the arrival flag B are reset, and then processing cycle ends.

Various modification examples of the example described with reference to FIGS. 15A to 18 are conceivable. For example, in one modification example, when the autonomous driving taxi 5 arrives at the desired boarding position of the user and the user is within the boarding/exiting platform 52 area, as illustrated in FIG. 15A, the indicator lamp 32a of the autonomous driving taxi 5 blinks with yellow light with the blinking pattern A, and as illustrated in FIG. 15B, the blinking pattern information of the indicator lamp 32a is displayed on the display screen of the mobile terminal 6 of the user. In addition, in another modification example, when the predicted arrival time t until the autonomous driving taxi 5 arrives at the desired boarding position of the user is less than the preset time tX, or when the autonomous driving taxi 5 arrives at the desired boarding position of the user, regardless of whether the user is within the boarding/exiting platform 52 area, the indicator lamp 32a of the autonomous driving taxi 5 blinks with yellow light with the blinking pattern A as illustrated in FIG. 15A, and as illustrated in FIG. 15B, the blinking pattern information of the indicator lamp 32a is displayed on the display screen of the mobile terminal 6 of the user.

Here, in the example illustrated in FIGS. 15A and 15B, as executed in the display control routine of FIGS. 16 and 17, when the predicted arrival time t until the autonomous driving taxi 5 arrives at the desired boarding position of the user is less than the preset time tX, and the user is within the boarding/exiting platform 52 area, as illustrated in FIG. 15A, the indicator lamp 32a of the autonomous driving taxi 5 blinks with yellow light with the blinking pattern A, and as illustrated in FIG. 15B, the blinking pattern information of the indicator lamp 32a is displayed on the display screen of the mobile terminal 6 of the user.

In this case, instead of using the predicted arrival time t until the autonomous driving taxi 5 arrives at the desired boarding position of the user as a reference, it is also possible to use as a reference the arrival time of a regular transportation system, such as a train, on the desired movement route of the user. For example, the user is considered to have arrived within the boarding/exiting platform 52 area when a preset time a elapses from a train arrival time tZ on the desired movement route of the user. Therefore, when the preset time a elapses from the train arrival time tZ on the desired movement route of the user, as illustrated in FIG. 15A, the indicator lamp 32a of the autonomous driving taxi 5 can be configured to blink with yellow light with the blinking pattern A, and as illustrated in FIG. 15B, the display screen of the mobile terminal 6 of the user can be configured to display the blinking pattern information of the indicator lamp 32a. In this case, the preset time a differs for each train station on the desired movement route of the user. In this case, when the train arrival time tZ on the desired movement route of the user comes, as illustrated in FIG. 15A, the indicator lamp 32a of the autonomous driving taxi 5 is configured to blink with yellow light with the blinking pattern A, and as illustrated in FIG. 15B, the display screen of the mobile terminal 6 of the user can be configured to display the blinking pattern information of the indicator lamp 32a.

Figure 19:
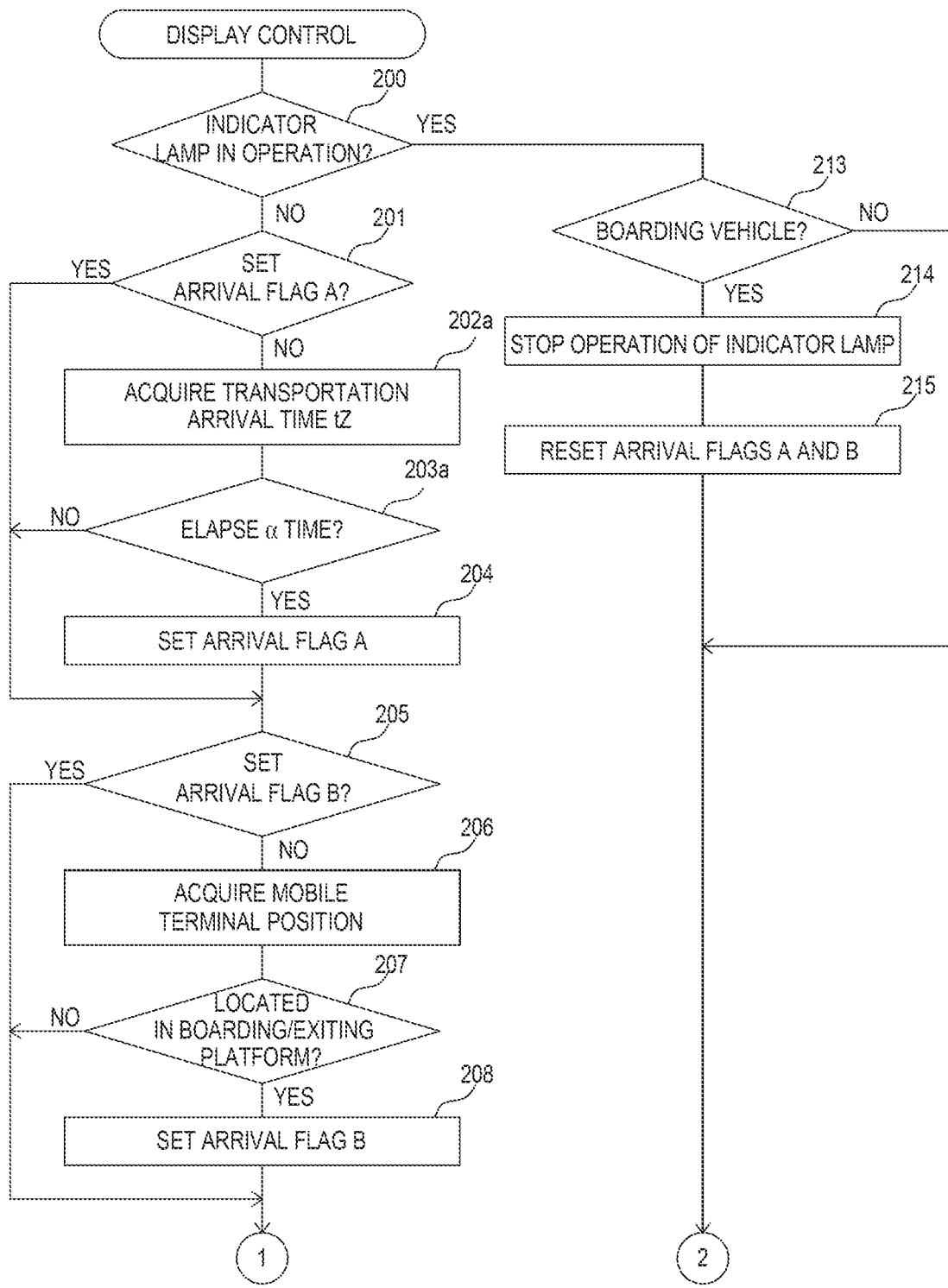
FIG. 19 is a flowchart for performing display control.
Figure 20:
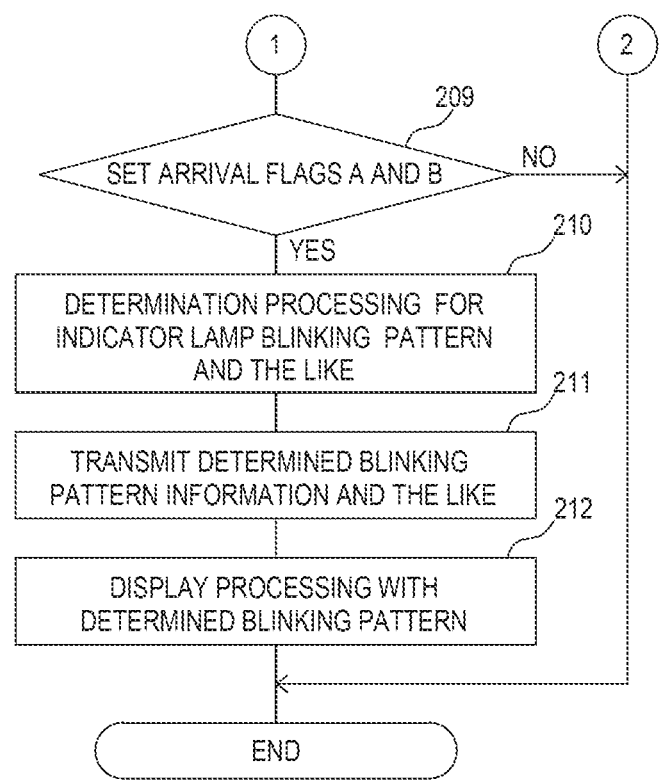
FIG. 20 is a flowchart for performing the display control.

However, in this case, whether the user is within the boarding/exiting platform 52 area can be added as a reference. FIGS. 19 and 20 illustrate a display control routine for executing another example based on whether the user is within the boarding/exiting platform 52 area in addition to train arrival time. The only difference between the display control routine illustrated in FIGS. 19 and 20 and the display control routine illustrated in FIGS. 16 and 17 is that the display control routine illustrated in FIGS. 19 and 20 uses steps 202a and 203a instead of steps 202 and 203 of the display control routine illustrated in FIGS. 16 and 17, and other steps are the same as those of the display control routine illustrated in FIGS. 16 and 17. Therefore, with regard to the display control routine illustrated in FIGS. 19 and 20, only steps 202a and 203a will be described, and description of other steps will be omitted.

Referring to the display control routine illustrated in FIGS. 19 and 20, in step 202a, the train arrival time tZ on the desired movement route is acquired. This train arrival time tZ is stored in the memory 26 of the electronic control unit 23 of the autonomous driving taxi 5. Next, in step 203a, it is determined whether the preset time a has elapsed from the train arrival time tZ on the desired movement route of the user, that is, whether the preset time a has elapsed after the train arrived. When it is determined that the preset time a has not elapsed after the train arrived, the process jumps to step 205. On the other hand, when it is determined that the preset time a has elapsed after the train arrived, the process proceeds to step 204 and the arrival flag A is set. Next, the process proceeds to step 205. In this way, in this example, the arrival flag A is set when it is determined that the preset time a has elapsed after the train arrived.

In this example, the arrival flag B is also set when it is determined that the user is within the boarding/exiting platform 52 area. Therefore, in this example, after the arrival of the train on the desired movement route of the user, when it is determined that the preset time a has elapsed and the user is within the boarding/exiting platform 52 area, as illustrated in FIG. 15A, the indicator lamp 32a of the autonomous driving taxi 5 blinks with yellow light with the blinking pattern A, and as illustrated in FIG. 15B, the blinking pattern information of the indicator lamp 32a is displayed on the display screen of the mobile terminal 6 of the user.

Next, another example will be described with reference to FIGS. 21 to 25.

For example, as illustrated in FIG. 14, a large number of autonomous driving taxis 5 are present at the boarding/exiting platform 52, and the indicator lamp 32a of each autonomous driving taxi 5 is blinking with a blinking pattern and blinking color determined for each autonomous driving taxi 5, if the blinking pattern and blinking color of the indicator lamp 32a of the autonomous driving taxi 5 dispatched to the user are the same as the blinking pattern and blinking color of the indicator lamp 32a of another autonomous driving taxi 5, the user cannot find the autonomous driving taxi 5 dispatched to the user from among many autonomous driving taxis 5.

Figure 21:
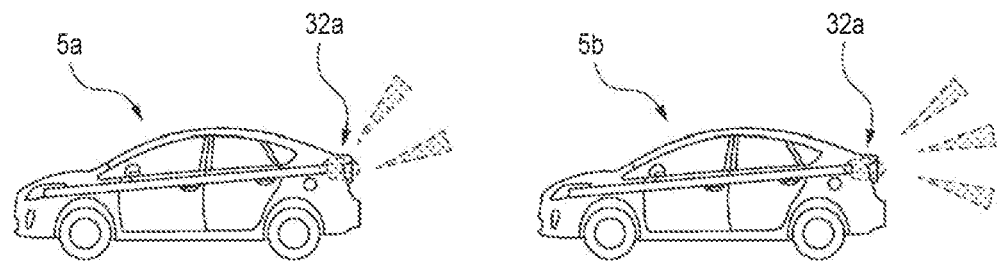
FIG. 21 is a side view of the autonomous driving taxi.
Figure 22A:
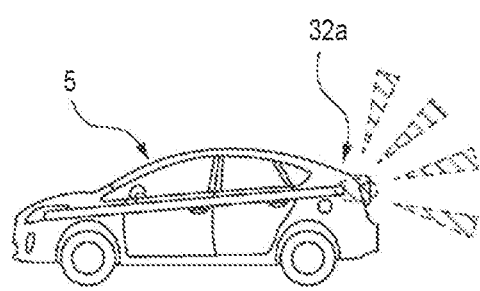
FIG. 22A is a side view of an autonomous driving taxi.
Figure 22B:
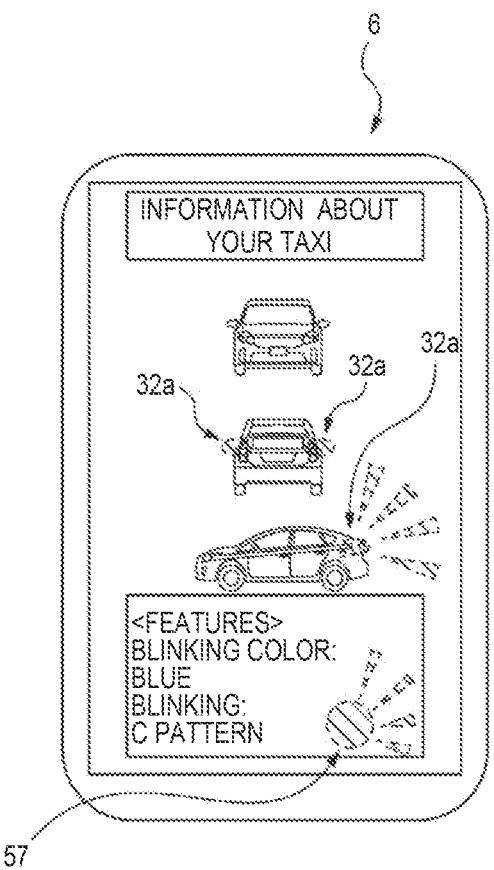
FIG. 22B is a diagram illustrating a display screen of a mobile terminal.

Therefore, in the example illustrated in FIGS. 21 to 25, when there are many other autonomous driving taxis 5 around the autonomous driving taxi 5 dispatched to the user, at least one or both of the blinking pattern and blinking color of the indicator lamp 32a of the autonomous driving taxi 5 dispatched to the user are adjusted to be different from the blinking pattern and blinking color of the indicator lamp 32a of the other autonomous driving taxi 5. One specific example of this example is illustrated in FIGS. 21 to 22B and will be described with reference to FIGS. 21 to 22B. FIG. 21 illustrates an autonomous driving taxi 5a and an autonomous driving taxi 5b that are present around the autonomous driving taxi 5 dispatched to the user, and FIG. 22A illustrates the autonomous driving taxi 5 dispatched to the user. In addition, FIG. 22B illustrates the display screen of the mobile terminal 6 of the user.

Referring first to FIG. 21, FIG. 21 illustrates a case where the blinking pattern of the indicator lamp 32a of the autonomous driving taxi 5a is set to a blinking pattern A, and the blinking pattern of the indicator lamp 32a of the autonomous driving taxi 5b is set to a blinking pattern B, and further both the indicator lamp 32a of the autonomous driving taxi 5a and the indicator lamp 32a of the autonomous driving taxi 5b blink in yellow. In such a case, in this example, as illustrated in FIG. 22A, the blinking pattern of the indicator lamp 32a of the autonomous driving taxi 5 dispatched to the user is set to a blinking pattern C different from the blinking pattern A of the indicator lamp 32a of the autonomous driving taxi 5a and the blinking pattern B of the indicator lamp 32a of the autonomous driving taxi 5b.

For example, in this case, the blinking cycle of the indicator lamp 32a of the autonomous driving taxi 5 dispatched to the user is set to a cycle different from the blinking cycle of the indicator lamp 32a of the autonomous driving taxi 5a and the blinking cycle of the indicator lamp 32a of the autonomous driving taxi 5b. Further, in this case, the blinking color of the indicator lamp 32a of the autonomous driving taxi 5 dispatched to the user is a different color, such as blue, from the blinking color of the indicator lamp 32a of the autonomous driving taxi 5a and the blinking color of the indicator lamp 32a of the autonomous driving taxi 5b. In this way, in this specific example, the blinking pattern of the indicator lamp 32a of the autonomous driving taxi 5 dispatched to the user is set to a blinking pattern different from the blinking pattern of the indicator lamp 32a of the autonomous driving taxi 5a and the blinking pattern of the indicator lamp 32a of the autonomous driving taxi 5b, and the blinking color of the indicator lamp 32a of the autonomous driving taxi 5 dispatched to the user is set to a color different from the blinking color of the indicator lamp 32a of the autonomous driving taxi 5a and the blinking color of the indicator lamp 32a of the autonomous driving taxi 5b.

In this case, in a state where the blinking color of the indicator lamp 32a of the autonomous driving taxi 5 dispatched to the user is set to the same color as the blinking color of the indicator lamp 32a of the autonomous driving taxi 5a and the blinking color of the indicator lamp 32a of the autonomous driving taxi 5b, the blinking pattern of the indicator lamp 32a of the autonomous driving taxi 5 dispatched to the user can be made to be different from the blinking pattern of the indicator lamp 32a of the autonomous driving taxi 5a and the blinking pattern of the indicator lamp 32a of the autonomous driving taxi 5b. In addition, in a state where the blinking pattern of the indicator lamp 32a of the autonomous driving taxi 5 dispatched to the user is set to the same blinking pattern as the blinking pattern of the indicator lamp 32a of the autonomous driving taxi 5a and the blinking pattern of the indicator lamp 32a of the autonomous driving taxi 5b, the blinking color of the indicator lamp 32a of the autonomous driving taxi 5 dispatched to the user can be made to be different from the blinking color of the indicator lamp 32a of the autonomous driving taxi 5a and the blinking color of the indicator lamp 32a of the autonomous driving taxi 5b.

Here, in this example, in FIG. 14, when the user is at the desired boarding position of the user, that is, within the boarding/exiting platform 52 area, if the autonomous driving taxi 5 reaches the boarding/exiting platform 52, the indicator lamp 32a starts blinking with blue light with the blinking pattern C as illustrated in FIG. 22A. On the other hand, in this case, the blinking pattern information on the blinking cycle of the indicator lamp 32a, the color of the light emitted from the indicator lamp 32a, and the like, and the information on the autonomous driving taxi 5 are transmitted from the autonomous driving taxi 5 to the mobile terminal 6 of the user, and in this case, information on the autonomous driving taxi 5 and the blinking pattern information as illustrated in FIG. 22B are displayed on the display screen of the mobile terminal 6 of the user.

In this case also, similar to the example illustrated in FIG. 15B, on the display screen of the mobile terminal 6 of the user, as illustrated in FIG. 22B, the front shape, the rear shape, and the side shape of the autonomous driving taxi 5 are displayed in a row in order from the top, and on the display screen of this mobile terminal 6, the indicator lamp 32a on the screen corresponding to the indicator lamp 32a of the autonomous driving taxi 5 illustrated in FIG. 22A synchronously blinks with the same blinking cycle and light color as the indicator lamp 32a of the autonomous driving taxi 5 illustrated in FIG. 22A. Further, on the display screen of the mobile terminal 6 of the user, the circular blinking area 57 blinks synchronously with the same blinking cycle and light color as the indicator lamp 32a of the autonomous driving taxi 5 illustrated in FIG. 22A.

Figure 23:
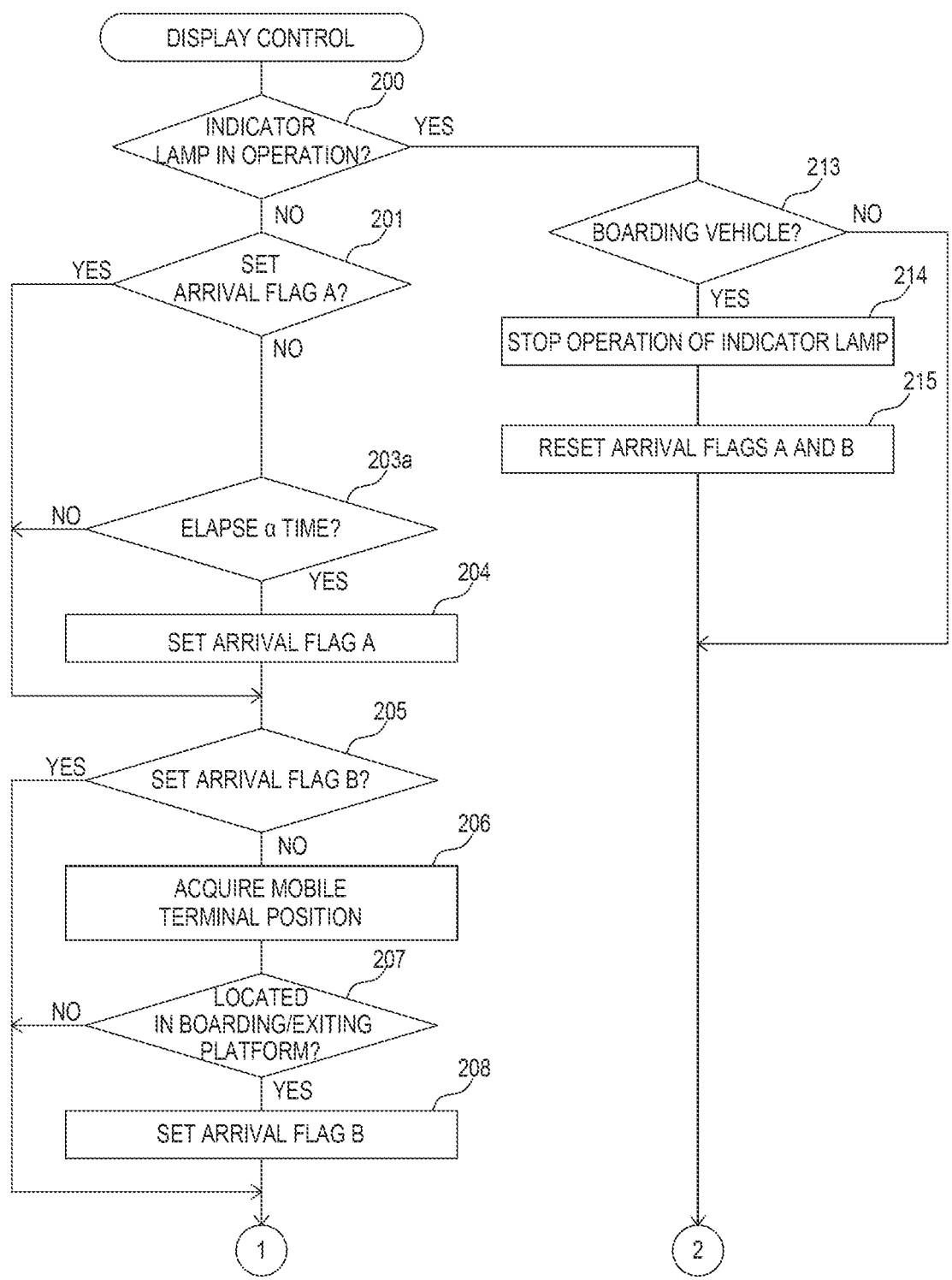
FIG. 23 is a flowchart for performing display control.
Figure 24:
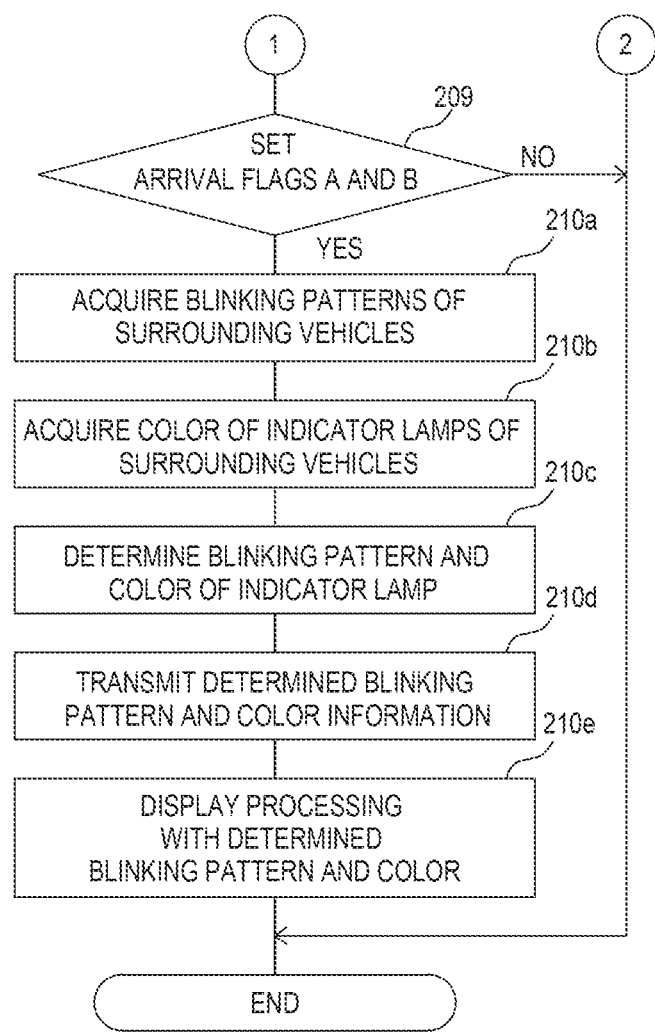
FIG. 24 is a flowchart for performing the display control.

FIGS. 23 and 24 illustrate a display control routine for executing the example illustrated in FIGS. 21 to 22B, and FIG. 25 illustrates the mobile terminal display screen control routine executed in the mobile terminal 6 of the user. Here, the only difference between the display control routine illustrated in FIGS. 23 and 24 and the display control routine illustrated in FIGS. 16 and 17 is that in the display control routine illustrated in FIGS. 23 and 24, step 203a is used instead of steps 202 and 203 of the display control routine illustrated in FIGS. 16 and 17, and steps 210a to 210e are used instead of steps 210 to 212 of the display control routine illustrated in FIGS. 16 and 17, and other steps are the same as those of the display control routine illustrated in FIGS. 16 and 17. Therefore, with regard to the display control routine illustrated in FIGS. 23 and 24, only steps 203a and steps 210a to 210e will be described, and description of other steps will be omitted.

Referring to the display control routine illustrated in FIGS. 23 and 24, in step 203a, it is determined whether the autonomous driving taxi 5 has arrived at the desired boarding position of the user, that is, the boarding/exiting platform 52. When it is determined that the autonomous driving taxi 5 has not arrived at the desired boarding position of the user, the process jumps to step 205. On the other hand, when it is determined that the autonomous driving taxi 5 has arrived at the desired boarding position of the user, the process proceeds to step 204 and the arrival flag A is set. Next the process proceeds to step 205. In this way, in this example, the arrival flag A is set when it is determined that the autonomous driving taxi 5 has arrived at the desired boarding position of the user, that is, the boarding/exiting platform 52.

In this example, the arrival flag B is also set when it is determined that the user is within the boarding/exiting platform 52 area. Therefore, in this example, when it is determined that the autonomous driving taxi 5 arrives at the desired boarding position of the user, that is, the boarding/exiting platform 52, and the user is within the boarding/exiting platform 52 area, the process proceeds from step 209 to step 210a. In step 210a, the blinking patterns of the indicator lamps 32a of the other autonomous driving taxis 5a and 5b being present around the autonomous driving taxi 5 are acquired using a surrounding detection sensor that is provided in the autonomous driving taxi 5 and detects the surroundings of the autonomous driving taxi 5, such as an in-vehicle camera that captures the front, side, and rear of the autonomous driving taxi 5. Next, in step 210b, using this surrounding detection sensor, the blinking colors of the indicator lamps 32a of the other autonomous driving taxis 5a and 5b being present around the autonomous driving taxi 5 are acquired.

Next, in step 210c, a blinking pattern different from the blinking patterns of the indicator lamps 32a of the other autonomous driving taxis 5a and 5b being present around the autonomous driving taxi 5 is determined, and a blinking color different from the blinking colors of the indicator lamps 32a of the other autonomous driving taxis 5a and 5b being present around the autonomous driving taxi 5 is determined. In this case, in this example, the blinking pattern of the indicator lamp 32a is set to the blinking pattern C, and the blinking color of the indicator lamp 32a is set to blue. Next, in step 210d, the blinking pattern information on the determined blinking cycle of the indicator lamp 32a and the determined color of the light of the indicator lamp 32a, and the like, and the information on the autonomous driving taxi 5 are transmitted to the mobile terminal 6 of the user. Next, in step 210e, the indicator lamp 32a of the autonomous driving taxi 5 blinks with blue light with the blinking pattern C, as illustrated in FIG. 22A.

Figure 25:
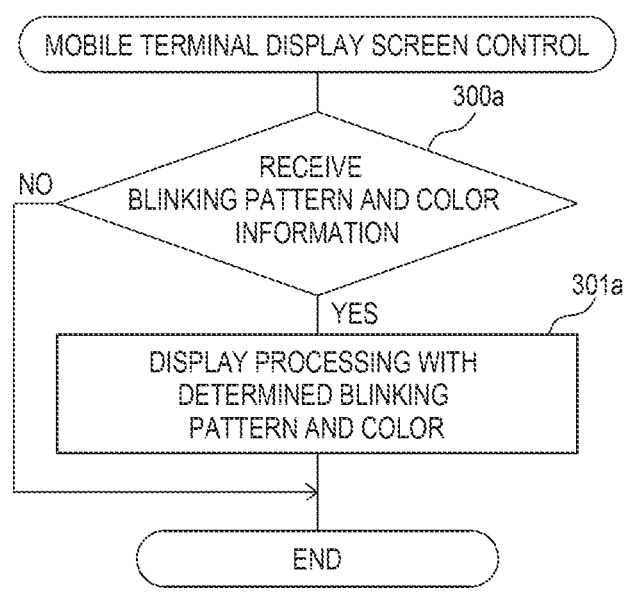
FIG. 25 is a flowchart for controlling a display screen of the mobile terminal.

Referring to the mobile terminal display screen control routine of FIG. 25 executed in the mobile terminal 6 of the user, in step 300a, it is determined whether the blinking pattern information on the blinking cycle of the indicator lamp 32a, the color of the light of the indicator lamp 32a and the like that is transmitted in step 210d of FIG. 24, and the information on the autonomous driving taxi 5 have been received, and then when these pieces of information are received, the process proceeds to step 301a, and the blinking pattern information of the indicator lamp 32a as illustrated in FIG. 22B is displayed on the display screen of the mobile terminal 6 of the user. In this way, when the autonomous driving taxi 5 arrives at the desired boarding position of the user, that is, the boarding/exiting platform 52, and the user is within the boarding/exiting platform 52 area, as illustrated in FIG. 22A, the indicator lamp 32a of the autonomous driving taxi 5 is blinking with blue light with the blinking pattern C, and as illustrated in FIG. 22B, the blinking pattern information of the indicator lamp 32a is displayed on the display screen of the mobile terminal 6 of the user.

Next, another example will be described with reference to FIGS. 26A to 28. For example, when the user is waiting for the autonomous driving taxi 5 dispatched to the user within the boarding/exiting platform 52 area, informing the user of how close the autonomous driving taxi 5 dispatched to the user is coming has the advantage of giving the user a sense of relief. Thus, in the example illustrated in FIGS. 26A to 28, as the autonomous driving taxi 5 dispatched to the user approaches the user, at least one or both of the blinking pattern and blinking color of the indicator lamp 32a of the autonomous driving taxi 5 dispatched to the user are changed.

Figure 26A:
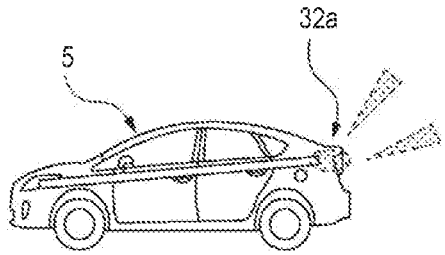
FIG. 26A is a side view of an autonomous driving taxi.
Figure 26B:
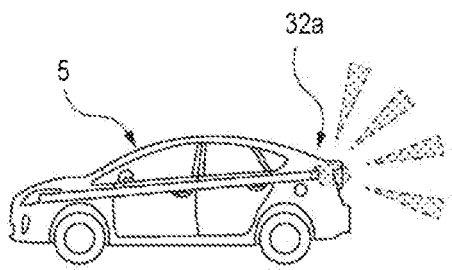
FIG. 26B is a side view of an autonomous driving taxi.
Figure 26C:
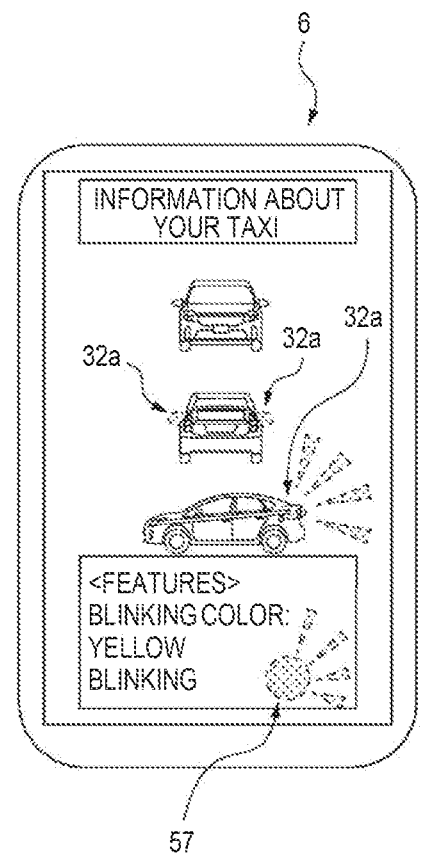
FIG. 26C is a diagram illustrating a display screen of a mobile terminal.

FIGS. 26A to 26C illustrates one specific example of this example. Referring to FIGS. 26A to 26C, in this specific example, when the user is at the desired boarding position of the user, that is, within the boarding/exiting platform 52 area, if the autonomous driving taxi 5 dispatched to the user approaches the user, for example if the distance between the autonomous driving taxi 5 dispatched to the user and the user becomes 100 m, as illustrated in FIG. 26A, the blinking pattern of the indicator lamp 32a of the autonomous driving taxi 5 is the blinking pattern A and the blinking color is yellow. Further, when the autonomous driving taxi 5 dispatched to the user gets closer to the user, for example when the distance between the autonomous driving taxi 5 dispatched to the user and the user becomes 10 m, as illustrated in FIG. 26B, the blinking pattern of the indicator lamp 32a of the autonomous driving taxi 5 is the blinking pattern C, which has a shorter blinking cycle than the blinking pattern A, and the blinking color is yellow.

In this case, the blinking pattern information on the blinking cycle of the indicator lamp 32a, the color of the light of the indicator lamp 32a, and the like, and the information on the autonomous driving taxi 5 are transmitted from the autonomous driving taxi 5 to the mobile terminal 6 of the user, and in this case, on the display screen of the mobile terminal 6 of the user, as illustrated in FIG. 26C, the front shape, the rear shape, and the side shape of the autonomous driving taxi 5 are displayed in a row in order from the top, and the indicator lamp 32a on the screen corresponding to the indicator lamp 32a of the autonomous driving taxi 5 illustrated in FIG. 26A or 26B and the circular blinking area 57 synchronously blink with the same blinking cycle and light color as the indicator lamp 32a of the autonomous driving taxi 5 illustrated in FIG. 26A or 26B.

That is, on the display screen of the mobile terminal 6 of the user, when the autonomous driving taxi 5 dispatched to the user approaches the user, for example when the distance between the autonomous driving taxi 5 dispatched to the user and the user becomes 100 m, the indicator lamp 32a on the screen corresponding to the indicator lamp 32a of the autonomous driving taxi 5 illustrated in FIG. 26A and the circular blinking area 57 synchronously blink with the same blinking cycle of the blinking pattern A and light color as the indicator lamp 32a of the autonomous driving taxi 5 illustrated in FIG. 26A. Then, when the distance between the autonomous driving taxi 5 dispatched to the user and the user becomes 10 m, the indicator lamp 32a on the screen corresponding to the indicator lamp 32a of the autonomous driving taxi 5 illustrated in FIG. 26B and the circular blinking area 57 synchronously blink with the same blinking period of the blinking pattern C and light color as the indicator lamp 32a of the autonomous driving taxi 5 illustrated in FIG. 26B.

Figure 27:
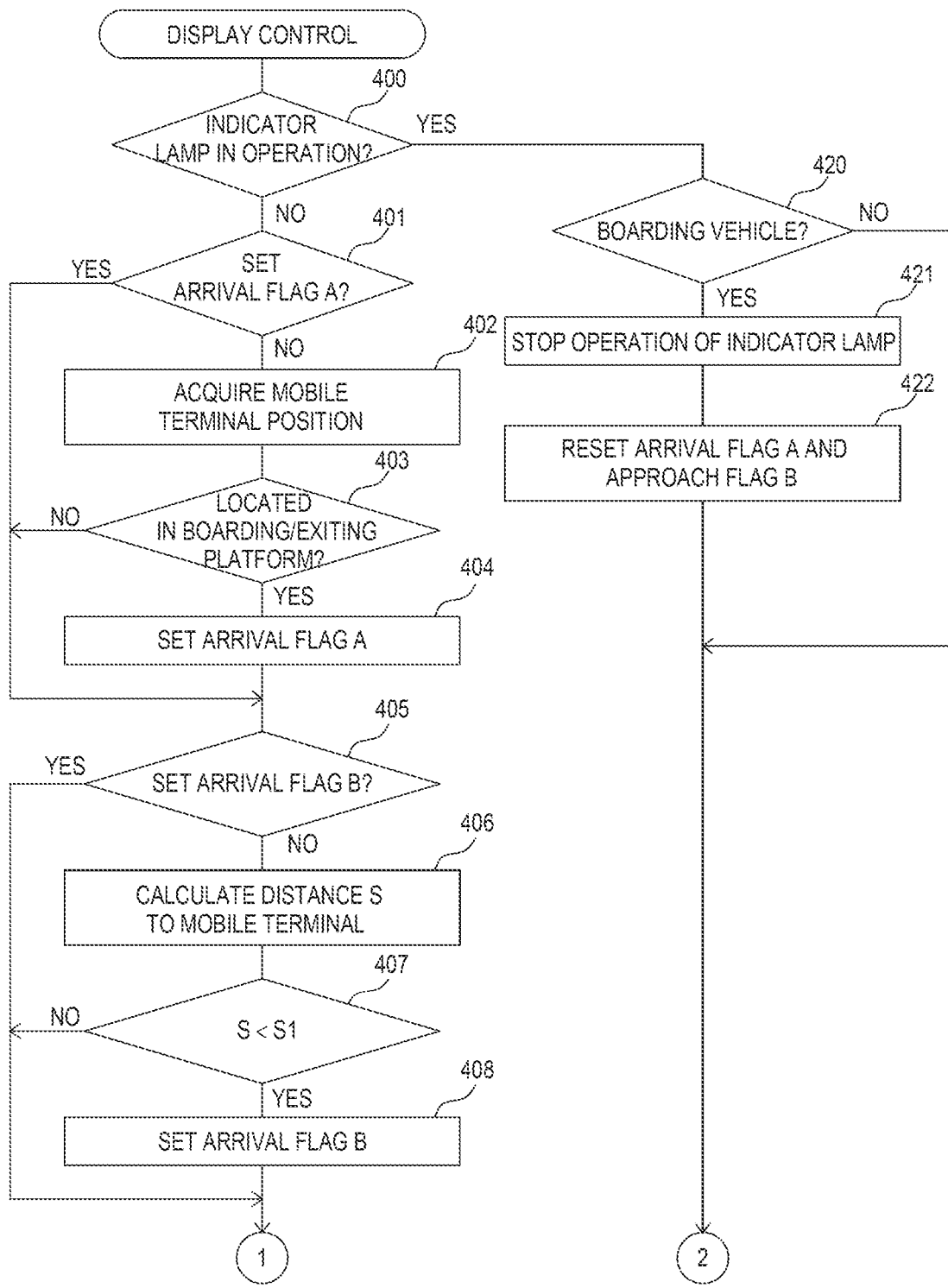
FIG. 27 is a flowchart for performing display control.
Figure 28:
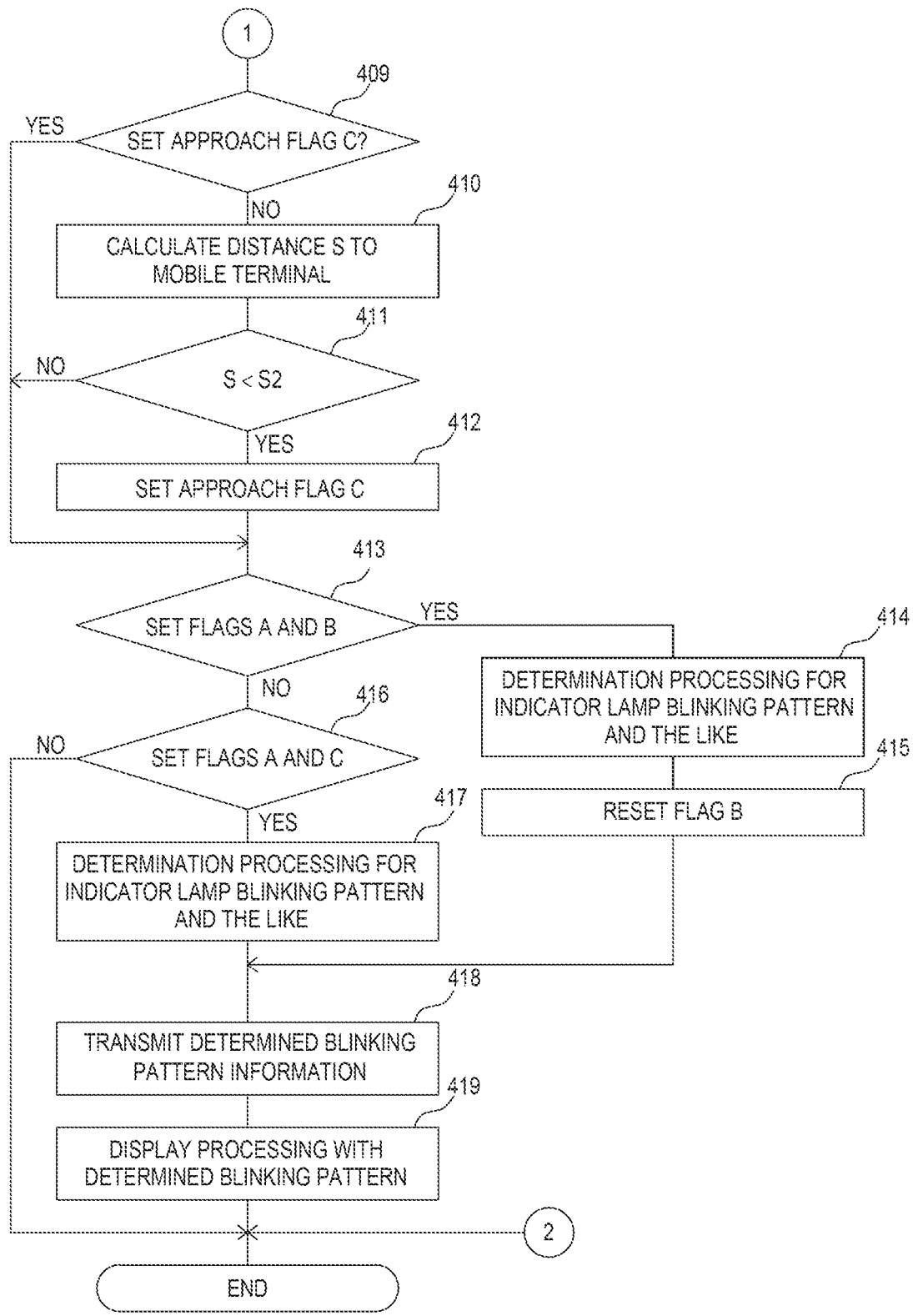
FIG. 28 is a flowchart for performing the display control.

FIGS. 27 and 28 illustrate a display control routine for executing the example illustrated in FIGS. 26A to 26C. This routine is executed by being interrupted at regular time intervals in the electronic control unit 23 of the autonomous driving taxi 5 selected for dispatch. In this example, the routine illustrated in FIG. 18 is used as the mobile terminal display screen control routine executed in the mobile terminal 6 of the user.

Referring to FIGS. 27 and 28, first, in step 400, it is determined whether the indicator lamp 32a of the autonomous driving taxi 5 is blinking according to the blinking pattern. When it is determined that the indicator lamp 32a of the autonomous driving taxi 5 is not blinking according to the blinking pattern, the process proceeds to step 401 to determine whether the arrival flag A is set, indicating that the user is within the boarding/exiting platform 52 area. When it is determined that the arrival flag A is set, the process jumps to step 405. On the other hand, when it is determined that the arrival flag A is not set, the process proceeds to step 402, and the mobile terminal 6 of the user is contacted to acquire the current location (for example, latitude and longitude) of the mobile terminal 6 as detected by the GPS receiver. Next, in step 403, it is determined whether this mobile terminal 6 is located within the boarding/exiting platform 52 area, that is, whether the user is within the boarding/exiting platform 52 area.

When it is determined in step 403 that the user is not within the boarding/exiting platform 52 area, the process jumps to step 405. On the other hand, when it is determined that the user is within the boarding/exiting platform 52 area, the process proceeds to step 404 and the arrival flag A is set. Next the process proceeds to step 405. In this way, in this example, when it is determined that the mobile terminal 6 of the user is located within the boarding/exiting platform 52 area, that is, when it is determined that the user is within the boarding/exiting platform 52 area, the arrival flag A is set.

In step 405, it is determined whether an approach flag B indicating that the autonomous driving taxi 5 is approaching the desired boarding position of the user is set. When it is determined that the approach flag B is set, the process jumps to step 409. On the other hand, when it is determined that the approach flag B is not set, the process proceeds to step 406, and the navigation device 31 calculates a distance to the current position of the mobile terminal 6 detected by the GPS receiver, that is, a distance S between the user and the autonomous driving taxi 5. Next, in step 407, it is determined whether this distance S has become less than a preset distance S1, for example, 100 m.

In step 407, when it is determined that the distance S between the user and the autonomous driving taxi 5 is not less than the preset distance S1, the process jumps to step 409. On the other hand, when it is determined that the distance S between the user and the autonomous driving taxi 5 is less than the preset distance S1, the process proceeds to step 408 and the approach flag B is set. Next, the process proceeds to step 409. In this way, in this example, the approach flag B is set when it is determined that the distance S between the user and the autonomous driving taxi 5 is less than the preset distance S1, for example 100 m.

In step 409, it is determined whether the approach flag C, which indicates that the autonomous driving taxi 5 is further approaching the desired boarding position of the user, is set. When it is determined that the approach flag C is set, the process jumps to step 413. On the other hand, when it is determined that the approach flag C is not set, the process proceeds to step 410, and the navigation device 31 calculates the distance to the current position of the mobile terminal 6 detected by the GPS receiver, that is, the distance S between the user and the autonomous driving taxi 5. Next, in step 411, it is determined whether this distance S has become less than a preset distance S2, for example, 10 m.

In step 411, when it is determined that the distance S between the user and the autonomous driving taxi 5 is not less than the preset distance S2, the process jumps to step 413. On the other hand, when it is determined that the distance S between the user and the autonomous driving taxi 5 is less than the preset distance S2, the process proceeds to step 412 and the approach flag C is set. Next, the process proceeds to step 413. In this way, in this example, the approach flag C is set when it is determined that the distance S between the user and the autonomous driving taxi 5 is less than the preset distance S2, for example 10 m.

In step 413, it is determined whether both the arrival flag A and the approach flag B are set. When it is determined that both the arrival flag A and the approach flag B are set, that is, when it is determined that the autonomous driving taxi 5 is at the desired boarding position of the user, that is, the boarding/exiting platform 52, and the distance S between the user and the autonomous driving taxi 5 has become less than the preset distance S1, for example, 100 m, the process proceeds to step 414, and the blinking pattern and the like of the indicator lamp 32a of the autonomous driving taxi 5 are determined. In this case, in this example, the blinking pattern of the indicator lamp 32a is set to the blinking pattern A, and the blinking color is yellow. Next, in step 415, the approach flag B is reset. Next, in step 418, the blinking pattern information on the determined blinking cycle of the indicator lamp 32a and the determined color of the light of the indicator lamp 32a, and the like, and the information on the autonomous driving taxi 5 are transmitted to the mobile terminal 6 of the user. Next, in step 419, the indicator lamp 32a of the autonomous driving taxi 5 blinks with yellow light with the blinking pattern A, as illustrated in FIG. 26A. Next, the processing cycle ends.

On the other hand, when in step 413, it is determined that both the arrival flag A and the approach flag B are not set, the process proceeds to step 416 to determine whether both the arrival flag A and the approach flag C are set. When it is determined that both the arrival flag A and the approach flag C are not set, the processing cycle ends. On the other hand, when it is determined that both the arrival flag A and the approach flag C are set, that is, when it is determined that the autonomous driving taxi 5 is at the desired boarding position of the user, that is, the boarding/exiting platform 52, and the distance S between the user and the autonomous driving taxi 5 has become less than the preset distance S2, for example, 10 m, the process proceeds to step 417 to determine the blinking pattern and the like of the indicator lamp 32a of the autonomous driving taxi 5. In this case, in this example, the blinking pattern of the indicator lamp 32a is set to the blinking pattern C, and the blinking color is yellow. Next, in step 418, the blinking pattern information on the determined blinking cycle of the indicator lamp 32a, the determined color of the light of the indicator lamp 32a, and the like, and the information on the autonomous driving taxi 5 are transmitted to the mobile terminal 6 of the user. Next, in step 419, the indicator lamp 32a of the autonomous driving taxi 5 blinks with yellow light with the blinking pattern C, as illustrated in FIG. 26B. Next, the processing cycle ends.

On the other hand, when it is determined in step 400 that the indicator lamp 32a of the autonomous driving taxi 5 is blinking according to the blinking pattern, the process proceeds to step 420 to determine whether the user or the like has performed the operation of boarding the autonomous driving taxi 5, or whether he or she has boarded. Also in this case, for example, when in step 89 of the driving control routine for the autonomous driving taxi illustrated in FIGS. 11 to 13, it is determined that the user who owns the terminal 6 has been authenticated as the user who requested the vehicle dispatch, or when the door of the autonomous driving taxi 5 is opened in step 90 of the driving control routine for the autonomous driving taxi illustrated in FIGS. 11 to 13, it is determined that the user or the like has performed the operation of boarding the autonomous driving taxi 5. When in step 92 of the driving control routine for the autonomous driving taxi illustrated in FIGS. 11 to 13, it is determined that boarding has been completed, it is determined that the user or the like has boarded the autonomous driving taxi 5. When it is determined that the user or the like has not performed the operation of boarding the autonomous driving taxi 5 and has not boarded the autonomous driving taxi 5, the processing cycle ends. On the other hand, when it is determined that the user or the like has performed the operation of boarding the autonomous driving taxi 5 or has boarded the autonomous driving taxi 5, the process proceeds to step 421, and the blinking operation of the indicator lamp 32a of the autonomous driving taxi 5 and the display of the blinking pattern information of the indicator lamp 32a on the display screen of the mobile terminal 6 of the user are stopped. Next, in step 422, the arrival flag A and the approach flag C are reset, and then the processing cycle ends.

Next, another example will be described with reference to FIGS. 29 to 32. In this example, when the autonomous driving taxi 5 dispatched to the user approaches the boarding/exiting platform 52, the user can freely set the blinking pattern and blinking color of the indicator lamp 32a of the autonomous driving taxi 5 dispatched to the user. In this example, when the autonomous driving taxi 5 dispatched to the user approaches the boarding/exiting platform 52, a setting request for the blinking pattern and blinking color of the indicator lamp 32a is transmitted from the autonomous driving taxi to the mobile terminal 6 of the user, and in this case, on the display screen of the mobile terminal 6 of the user, as illustrated in FIG. 29, the front shape, the rear shape, and the side shape of the autonomous driving taxi 5 are displayed in a row in order from the top, and setting fields for the blinking pattern and blinking color of the indicator lamp 32a are displayed.

Figure 29:
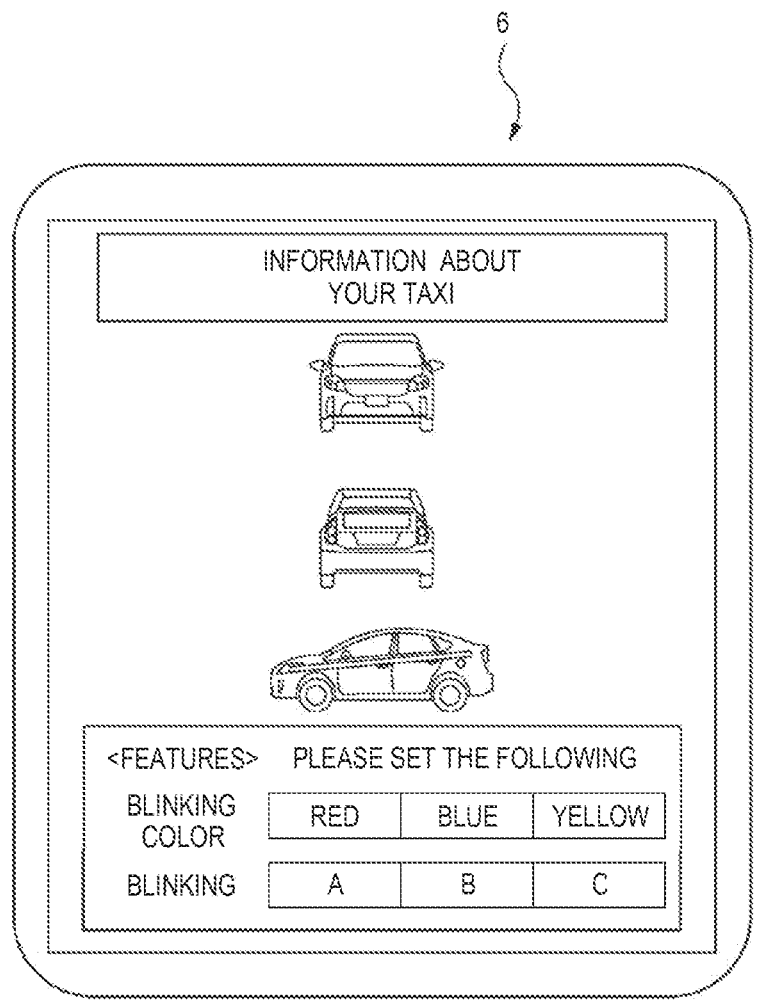
FIG. 29 is a diagram illustrating a display screen of a mobile terminal.

In one specific example of this setting field illustrated in FIG. 29, three blinking colors, red, blue, and yellow, are shown, and three blinking patterns, the blinking pattern A, the blinking pattern B, and the blinking pattern C, which have different blinking cycles, are provided. In this case, for example, buttons for selecting red, blue, and yellow as blinking colors are displayed for each color, and the blinking colors are set by touching these buttons. In addition, buttons for selecting the blinking pattern A, the blinking pattern B, and the blinking pattern C as blinking patterns are displayed for each blinking pattern, and the blinking patterns are set by touching these buttons. When the blinking color and blinking pattern are set, the blinking action of the indicator lamp 32a of the autonomous driving taxi 5 is performed with the set blinking color and blinking pattern, and a part of the display screen of the mobile terminal 6 of the user blinks in synchronization with this blinking action. FIG. 29 only illustrates an example, and various other blinking colors and other various blinking patterns can be used.

Figure 30:
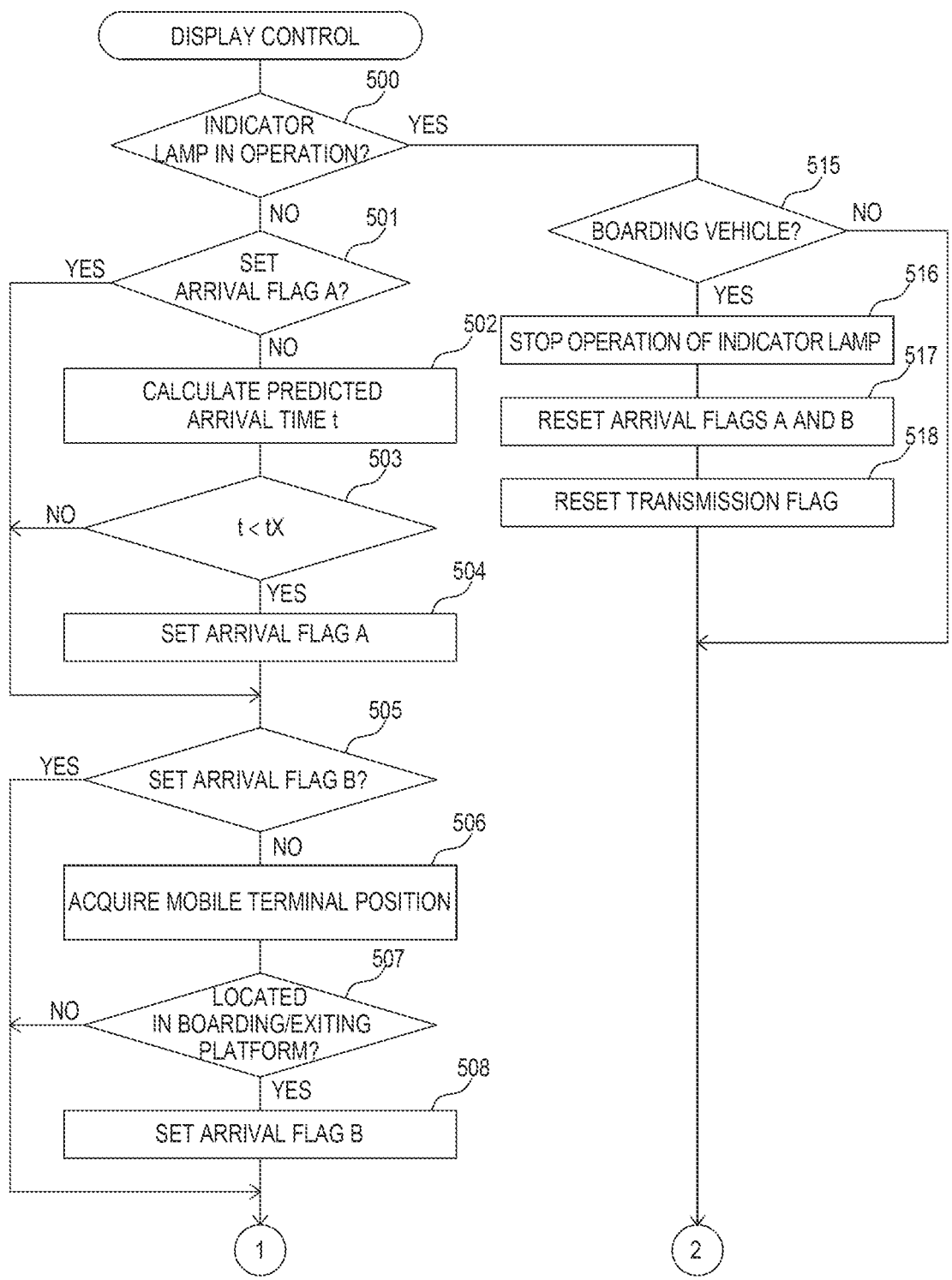
FIG. 30 is a flowchart for performing display control.
Figure 31:
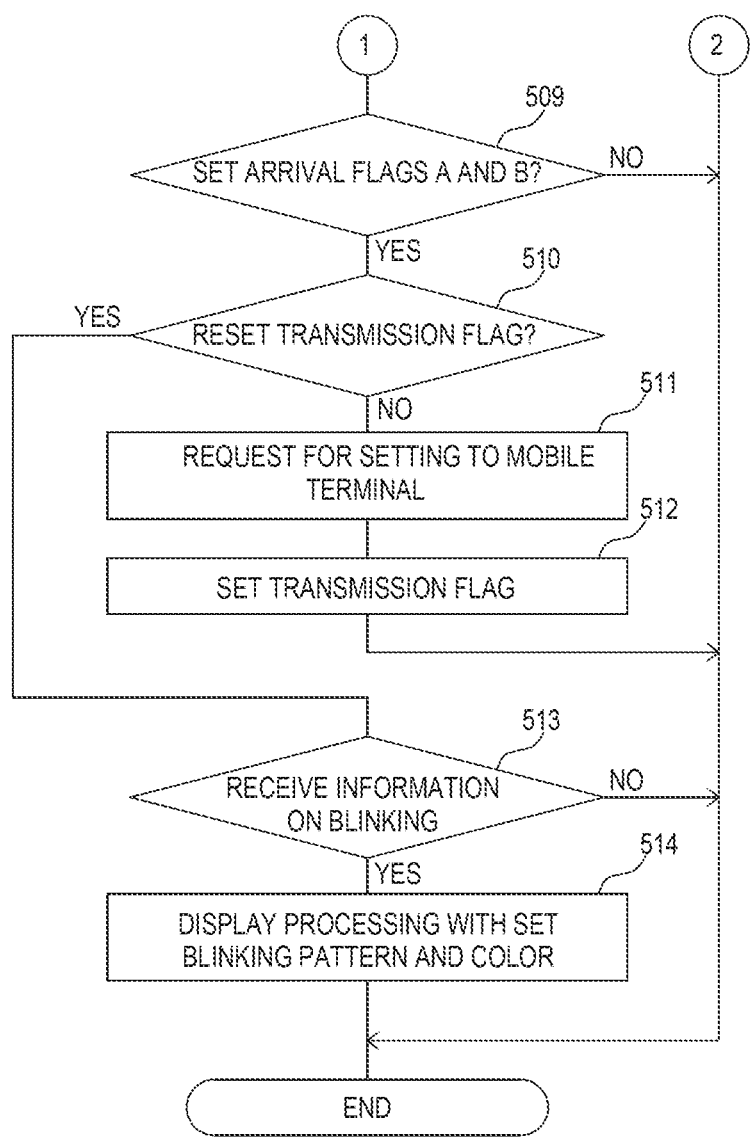
FIG. 31 is a flowchart for performing the display control.
Figure 32:
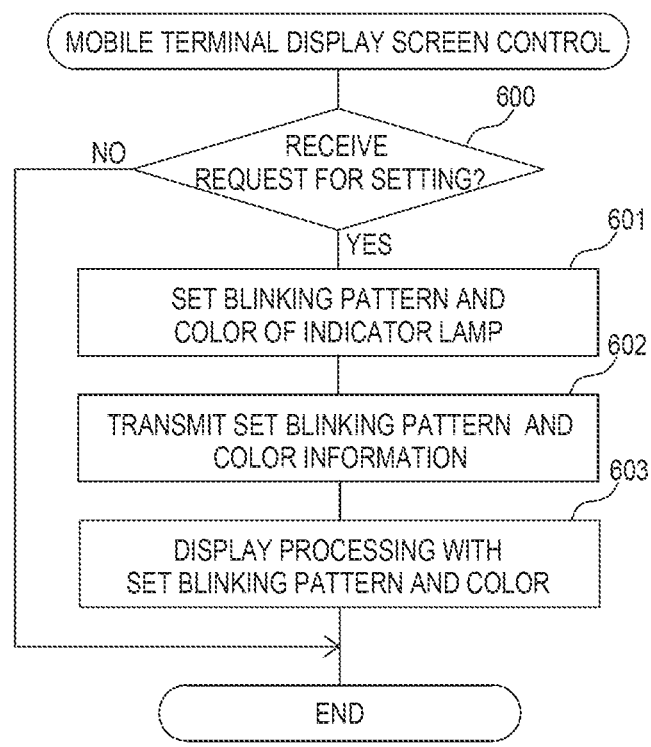
FIG. 32 is a flowchart for controlling the display screen of the mobile terminal.

FIGS. 30 and 31 illustrate a display control routine for executing the example illustrated in FIG. 29, and this routine is executed by being interrupted at regular time intervals in the electronic control unit 23 of the autonomous driving taxi 5 selected for dispatch. FIG. 32 illustrates the mobile terminal display screen control routine executed in the mobile terminal 6 of the user.

Referring to FIGS. 30 and 31, first, in step 500, it is determined whether the indicator lamp 32a of the autonomous driving taxi 5 is blinking according to the blinking pattern. When it is determined that the indicator lamp 32a of the autonomous driving taxi 5 is not blinking according to the blinking pattern, the process proceeds to step 501 to determine whether the arrival flag A indicating that the autonomous driving taxi 5 has arrived at the desired boarding position of the user is set. When it is determined that the arrival flag A is set, the process jumps to step 505. On the other hand, when it is determined that the arrival flag A is not set, the process proceeds to step 502, and the navigation device 31 calculates a predicted arrival time t until the autonomous driving taxi 5 reaches the desired boarding position of the user. Next, in step 503, it is determined whether this predicted arrival time t is less than a preset time tX.

When it is determined in step 503 that this predicted arrival time t is not less than the preset time tX, the process jumps to step 505. On the other hand, when it is determined that the predicted arrival time t is less than the preset time tX, the process proceeds to step 504 and the arrival flag A is set. Next the process proceeds to step 505. In this way, in this example, the arrival flag A is set when the predicted arrival time t until the autonomous driving taxi 5 arrives at the desired boarding position of the user is less than the preset time tX.

In step 505, it is determined whether the arrival flag B is set, which indicates that the user is within the boarding/exiting platform 52 area. When it is determined that the arrival flag B is set, the process jumps to step 509. On the other hand, when it is determined that the arrival flag B is not set, the process proceeds to step 506 to contact the mobile terminal 6 of the user to acquire the current location (for example, latitude and longitude) of the mobile terminal 6 detected by the GPS receiver. Next, in step 507, it is determined whether this mobile terminal 6 is located within the boarding/exiting platform 52 area, that is, whether the user is within the boarding/exiting platform 52 area.

When it is determined in step 507 that the user is not within the boarding/exiting platform 52 area, the process jumps to step 509. On the other hand, when it is determined that the user is within the boarding/exiting platform 52 area, the process proceeds to step 508, and the arrival flag B is set. Next, the process proceeds to step 509. In this way, in this example, when it is determined that the mobile terminal 6 of the user is located within the boarding/exiting platform 52 area, that is, when it is determined that the user is within the boarding/exiting platform 52 area, the arrival flag B is set.

In step 509, it is determined whether both the arrival flag A and the arrival flag B are set. When it is determined that both the arrival flag A and the arrival flag B are not set, the processing cycle ends. On the other hand, when it is determined that both the arrival flag A and the arrival flag B are set, that is, when it is determined that the predicted arrival time t until the autonomous driving taxi 5 arrives at the user's desired boarding position is less than the preset time tX, and the user is within the boarding/exiting platform 52 area, the process proceeds to step 510, and it is determined whether a transmission flag that is set when a request for setting the blinking pattern and blinking color of the indicator lamp 32a is transmitted to the mobile terminal 6 of the user is set. When it is determined that the transmission flag is not set, the process proceeds to step 511 to transmit information on the autonomous driving taxi 5 together with a request for setting the blinking pattern and blinking color of the indicator lamp 32a to the mobile terminal 6 of the user. Next, in step 512, the transmission flag is set, and the processing cycle ends.

Here, referring to the mobile terminal display screen control routine of FIG. 32 executed in the mobile terminal 6 of the user, in step 600, it is determined whether the request for setting the blinking pattern and blinking color of the indicator lamp 32a transmitted in step 511 of FIG. 31 has been received. Then, when it is determined that this setting request is received, the process proceeds to step 601, and on the display screen of the mobile terminal 6 of the user, the front shape, the rear shape, and the side shape of the autonomous driving taxi 5 as illustrated in FIG. 29 are displayed in a row in order from the top, and the setting fields for the blinking pattern and blinking color of the indicator lamp 32a is displayed, and then the blinking pattern and blinking color of the indicator lamp 32a are set by the user. Next, in step 602, the blinking pattern and blinking color of the indicator lamp 32a set by the user are transmitted to the autonomous driving taxi 5, and then, in step 603, the display on the display screen of the mobile terminal 6 is performed with the blinking pattern and blinking color of the indicator lamp 32a set by the user.

Referring to FIGS. 30 and 31 again, when the transmission flag is set in step 510, the process proceeds from step 510 to step 513, and it is determined whether the blinking information transmitted in step 602 of FIG. 32, that is, the set blinking pattern and blinking color of the indicator lamp 32a has been received. When it is determined that the set blinking pattern and blinking color of the indicator lamp 32a have not been received, the processing cycle ends. On the other hand, when it is determined that the set blinking pattern and blinking color of the indicator lamp 32a have been received, the process proceeds to step 514, and the indicator lamp 32a of the autonomous driving taxi 5 blinks with the predetermined blinking pattern and blinking color.

On the other hand, when it is determined in step 500 that the indicator lamp 32a of the autonomous driving taxi 5 is blinking according to the blinking pattern, the process proceeds to step 515 to determine whether the user or the like has performed the operation of boarding the autonomous driving taxi 5, or whether he or she has boarded. Also in this case, for example, when, in step 89 of the driving control routine for the autonomous driving taxi illustrated in FIGS. 11 to 13, it is determined that the user who owns the terminal 6 has been authenticated as the user who requested the vehicle dispatch, or when the door of the autonomous driving taxi 5 is opened in step 90 of the driving control routine for the autonomous driving taxi illustrated in FIGS. 11 to 13, it is determined that the user or the like performed the operation of boarding the autonomous driving taxi 5. In addition, in step 92 of the driving control routine for the autonomous driving taxi illustrated in FIGS. 11 to 13, it is determined that the user or the like has boarded the autonomous driving taxi 5 when it is determined that boarding has been completed. When it is determined that the user or the like has not performed the operation of boarding the autonomous driving taxi 5 and has not boarded, the processing cycle ends. On the other hand, when it is determined that the user or the like has performed the operation of boarding the autonomous driving taxi 5 or has boarded, the process proceeds to step 516, and the blinking operation of the indicator lamp 32*a* of the autonomous driving taxi 5 and the blinking display of the indicator lamp 32*a* on the display screen of the mobile terminal 6 of the user are stopped. Next, in step 517, the arrival flag A and arrival flag B are reset, and then in step 518, the transmission flag is reset. Next, the processing cycle ends.

In addition, as a method that finds the autonomous driving taxi 5 dispatched to the user from among a large number of autonomous driving taxis 5, in addition to the various methods that have been described so far, for example, it is also possible to find the autonomous driving taxi 5 dispatched to the user by using a mobile terminal that can use an AR (augmented reality) technique. In addition, instead of the indicator lamp 32*a*, it is also possible to use a display device arranged on the vehicle so as to be visible from the outside of the vehicle, to transmit texts and graphics from the mobile terminal 6 to the display device, and to display the transmitted texts and graphics on the display device. In addition to the various display methods described so far, it is also possible to generate a voice for distinguishing the autonomous driving taxi 5 dispatched to the user from other autonomous driving taxis 5.

Thus, in the example of the present disclosure, an information processing device comprises a processor 25 configured to cause an information display unit 32 to blink with a predetermined blinking pattern, and transmit to a terminal 6 of the user blinking information which causes at least part of a display screen of the terminal 6 of the user to blink in the same pattern as this blinking pattern. The information display unit 32 is arranged on a vehicle such that a user of the vehicle is able to see the information display unit 32 from outside of the vehicle.

Further, in the example of the present disclosure, an information processing method is provided that causes an information display unit 32 to blink with a predetermined blinking pattern, and transmits to a terminal 6 of the user blinking pattern information which causes at least part of a display screen of the terminal 6 of the user to blink in the same pattern as this blinking pattern. The information display unit 32 is arranged on a vehicle such that a user of the vehicle is able to see the information display unit from outside of the vehicle.

In addition, in the example of the present disclosure, a program is provided that causes a computer to cause an information display unit 32 to blink with a predetermined blinking pattern, and transmit to a terminal 6 of the user blinking pattern information which causes at least part of a display screen of the terminal 6 of the user in the same pattern as this blinking pattern. The information display unit 32 is arranged on a vehicle such that a user of the vehicle is able to see the information display unit from outside of the vehicle.

Further, in the example of the present disclosure, the information display unit 32 described above consists of the indicator lamp 32*a* installed on an outer side of the vehicle, and in one example of the present disclosure, this indicator lamp 32*a* consists of an emergency flashing indicator lamp 32*a* installed on the vehicle. In addition, in the example of the present disclosure, the blinking pattern information includes information which causes at least part of the display screen of the terminal 6 of the user to synchronously blink in the same pattern as the predetermined blinking pattern described above. In this case, the processor 25 controls a blinking color of the information display unit 32 in addition to causing the information display unit 32 to blink in the predetermined blinking pattern, and the blinking pattern information includes color information which causes at least part of the display screen of the terminal 6 of the user of the vehicle to blink in the same color as the blinking color described above.

Further, in an example of the present disclosure, the processor 25 is configured to cause the information display unit 32 described above to blink in the predetermined blinking pattern when the user is present at a position where the information display unit 32 is visible. In addition, in an example of the present disclosure, the processor 25 is configured to stop a blinking operation of the information display unit 32 when the user has performed an operation of boarding the vehicle or when the user has boarded the vehicle. In addition, the processor 25 is configured to cause the information display unit 32 to blink in the predetermined blinking pattern at an arrival time of a regular transportation system used by the user before using the vehicle, or after a predetermined time has elapsed from the arrival time.

Further, in the example of the present disclosure, the processor 25 is configured to cause the information display unit 32 described above to blink such that at least one or both of the predetermined blinking pattern and blinking color are different from blinking patterns and blinking colors of other vehicles present around the vehicle. In addition, in the example of the present disclosure, the processor 25 is configured to change the predetermined blinking pattern according to a distance S between the vehicle and the user. In this case, the processor 25 is configured to shorten a blinking cycle of the predetermined blinking pattern as the distance S between the vehicle and the user decreases.

What is claimed is:

1. An information processing device comprising a processor configured to:
   receive information including a desired movement route of a user;
   cause an information display unit to blink with a predetermined blinking pattern at an arrival time of a regular transportation system used by the user before using the vehicle according to the desired movement route of the user, or after a predetermined time has elapsed from the arrival time, the information display unit being arranged on a vehicle such that the user of the vehicle is able to see the information display unit from outside of the vehicle; and transmit to a terminal of the user blinking pattern information which causes at least part of a display screen of the terminal of the user to blink in the same pattern as the predetermined blinking pattern.

2. The information processing device according to claim 1, wherein the information display unit is an indicator lamp installed on an outer side of the vehicle.

3. The information processing device according to claim 2, wherein the indicator lamp is an emergency flashing indicator lamp installed in the vehicle.

4. The information processing device according to claim 1, wherein the blinking pattern information includes information which causes at least part of the display screen of the terminal of the user to synchronously blink in the same pattern as the predetermined blinking pattern.

5. The information processing device according to claim 1, wherein:

the processor is configured to control a blinking color of the information display unit in addition to causing the information display unit to blink in the predetermined blinking pattern; and the blinking pattern information includes color information which causes at least part of the display screen of the terminal of the user of the vehicle to blink in the same color as the blinking color.

6. The information processing device according to claim 1, wherein the processor is configured to cause the information display unit to blink in the predetermined blinking pattern when the user is present at a position where the information display unit is visible.

7. The information processing device according to claim 1, wherein the processor is configured to stop a blinking operation of the information display unit when the user has performed an operation of boarding the vehicle or when the user has boarded the vehicle.

8. The information processing device according to claim 1, wherein the processor is configured to cause the information display unit to blink such that at least one or both of the predetermined blinking pattern and a blinking color are different from blinking patterns and blinking colors of other vehicles present around the vehicle.

9. The information processing device according to claim 1, wherein the processor is configured to change the predetermined blinking pattern according to a distance between the vehicle and the user.

10. The information processing device according to claim 9, wherein the processor is configured to shorten a blinking cycle of the predetermined blinking pattern as the distance between the vehicle and the user decreases.

11. An information processing method that is executed by a computer, the information processing method comprising:

receiving information including a desired movement route of a user;

causing an information display unit to blink with a predetermined blinking pattern at an arrival time of a regular transportation system used by the user before using the vehicle according to the desired movement route of the user, or after a predetermined time has elapsed from the arrival time, the information display unit being arranged on a vehicle such that the user of the vehicle is able to see the information display unit from outside of the vehicle; and transmitting to a terminal of the user blinking pattern information which causes at least part of a display screen of the terminal of the user to blink in the same pattern as the predetermined blinking pattern.

12. A non-temporary storage medium that stores an instruction executable by one or more processors and causing the one or more processors to perform functions comprising:

receiving information including a desired movement route of a user;

causing an information display unit to blink with a predetermined blinking pattern at an arrival time of a regular transportation system used by the user before using the vehicle according to the desired movement route of the user, or after a predetermined time has elapsed from the arrival time, the information display unit being arranged on a vehicle such that a user of the vehicle is able to see the information display unit from outside of the vehicle; and transmitting to a terminal of the user blinking pattern information which causes at least part of a display screen of the terminal of the user to blink in the same pattern as the predetermined blinking pattern.

* * * * *